US012129654B2

(12) United States Patent
Neeb et al.

(10) Patent No.: US 12,129,654 B2
(45) Date of Patent: Oct. 29, 2024

(54) EAVESTROUGH DEBRIS GUARD

(71) Applicant: 5002193 ONTARIO INC., Guelph (CA)

(72) Inventors: Timothy Howard Neeb, Guelph (CA); Tristan Zimmermann, Guelph (CA); Matthew Hadden, Guelph (CA)

(73) Assignee: EXCELSIOR INC., Guelph (CA)

( * ) Notice: Subject to any disclaimer, the term of this patent is extended or adjusted under 35 U.S.C. 154(b) by 0 days.

(21) Appl. No.: 16/829,682

(22) Filed: Mar. 25, 2020

(65) Prior Publication Data
US 2020/0308839 A1   Oct. 1, 2020

Related U.S. Application Data

(60) Provisional application No. 62/823,993, filed on Mar. 26, 2019.

(51) Int. Cl.
*E04D 13/068* (2006.01)
*E04D 13/076* (2006.01)

(52) U.S. Cl.
CPC ......... *E04D 13/076* (2013.01); *E04D 13/068* (2013.01)

(58) Field of Classification Search
CPC . E04D 13/064; E04D 13/0643; E04D 13/068; E04D 13/076
USPC ....................................................... 52/11, 12
See application file for complete search history.

(56) References Cited

U.S. PATENT DOCUMENTS

| 3,531,899 A | | 10/1970 | Bartlett | |
|---|---|---|---|---|
| 3,911,632 A | * | 10/1975 | Bryfogle | E04D 13/064 52/13 |
| 4,631,875 A | | 12/1986 | Olson | |
| 5,406,756 A | * | 4/1995 | Bemis | E04D 13/064 248/48.1 |
| 5,459,965 A | * | 10/1995 | Meckstroth | E04D 13/076 210/474 |
| 5,956,904 A | * | 9/1999 | Gentry | E04D 13/076 210/474 |
| 6,016,631 A | * | 1/2000 | Lowrie, III | E04D 13/076 52/12 |
| 6,151,837 A | | 11/2000 | Ealer, Sr. | |
| 6,161,338 A | * | 12/2000 | Kuhns | E04D 13/076 210/474 |
| 6,942,419 B2 | * | 9/2005 | Knak | E03F 5/06 210/163 |

(Continued)

OTHER PUBLICATIONS

Non-Final Official Action for corresponding U.S. Appl. No. 17/508,004 dated Oct. 21, 2022.

*Primary Examiner* — James J Buckle, Jr.
(74) *Attorney, Agent, or Firm* — Gowling WLG (Canada) LLP

(57) ABSTRACT

A debris guard for installation on an eavestrough is disclosed. The debris guard including a frame with a back side, a front side, a length and two ends. The frame having a water collection portion between the front side and the back side that extends along the length of the frame, the water collection portion having a plurality of holes to allow rainwater to pass through. The frame having a connector engagement structure that extends outward from a surface of the water collection portion, the connector engagement structure being shaped and/or sized to attach with a connector for joining pieces or lengths of the frame together.

18 Claims, 18 Drawing Sheets

(56) References Cited

U.S. PATENT DOCUMENTS

| | | | | |
|---|---|---|---|---|
| 7,310,912 B2* | 12/2007 | Lenney | E04D 13/076 210/162 |
| 7,434,358 B2* | 10/2008 | Smith | E04B 1/34342 52/11 |
| 7,610,722 B1* | 11/2009 | Carroll | E04D 13/064 138/165 |
| 7,627,991 B1* | 12/2009 | Feldhaus | E04D 13/076 210/155 |
| 7,896,295 B2* | 3/2011 | Beck | G02B 6/4459 248/68.1 |
| 7,913,458 B2* | 3/2011 | Higginbotham | E04D 13/0765 52/12 |
| 7,975,435 B2* | 7/2011 | Lenney | E04D 13/076 52/12 |
| 8,001,729 B2* | 8/2011 | Joly, Jr. | E04D 13/076 52/12 |
| 8,079,183 B2* | 12/2011 | Lenney | E04D 13/0762 52/12 |
| 8,438,787 B2* | 5/2013 | Lenney | E04D 13/0762 52/12 |
| 8,479,454 B2* | 7/2013 | Lenney | E04D 13/076 52/12 |
| 8,549,791 B1* | 10/2013 | Loughren | E04D 13/158 52/13 |
| D753,468 S * | 4/2016 | Weger | D8/356 |
| 10,125,496 B2* | 11/2018 | Lenney | E04D 13/0727 |
| 10,538,920 B2* | 1/2020 | Sager | E04D 13/076 |
| D885,530 S * | 5/2020 | Gori | D23/267 |
| D885,531 S * | 5/2020 | Gori | D23/267 |
| 11,713,580 B2* | 8/2023 | Lenney | E04D 13/072 52/12 |
| 11,788,296 B2* | 10/2023 | Lenney | E04D 13/076 52/12 |
| 2005/0274081 A1 | 12/2005 | Welty | |
| 2005/0274082 A1 | 12/2005 | Welty | |
| 2006/0225368 A1* | 10/2006 | Roe | E04D 13/064 52/12 |
| 2013/0067830 A1* | 3/2013 | Sharkey | E04D 13/076 52/12 |
| 2013/0097943 A1* | 4/2013 | Higginbotham | E04D 13/064 52/12 |
| 2013/0160377 A1* | 6/2013 | Sager | E04D 13/076 52/12 |
| 2014/0215929 A1* | 8/2014 | Lenney | E04D 13/0727 52/12 |
| 2016/0102459 A1* | 4/2016 | Breyer | E04D 13/064 52/12 |
| 2019/0330852 A1* | 10/2019 | Gori | E04D 13/068 |
| 2019/0352912 A1* | 11/2019 | Sager | E04D 13/0481 |

* cited by examiner

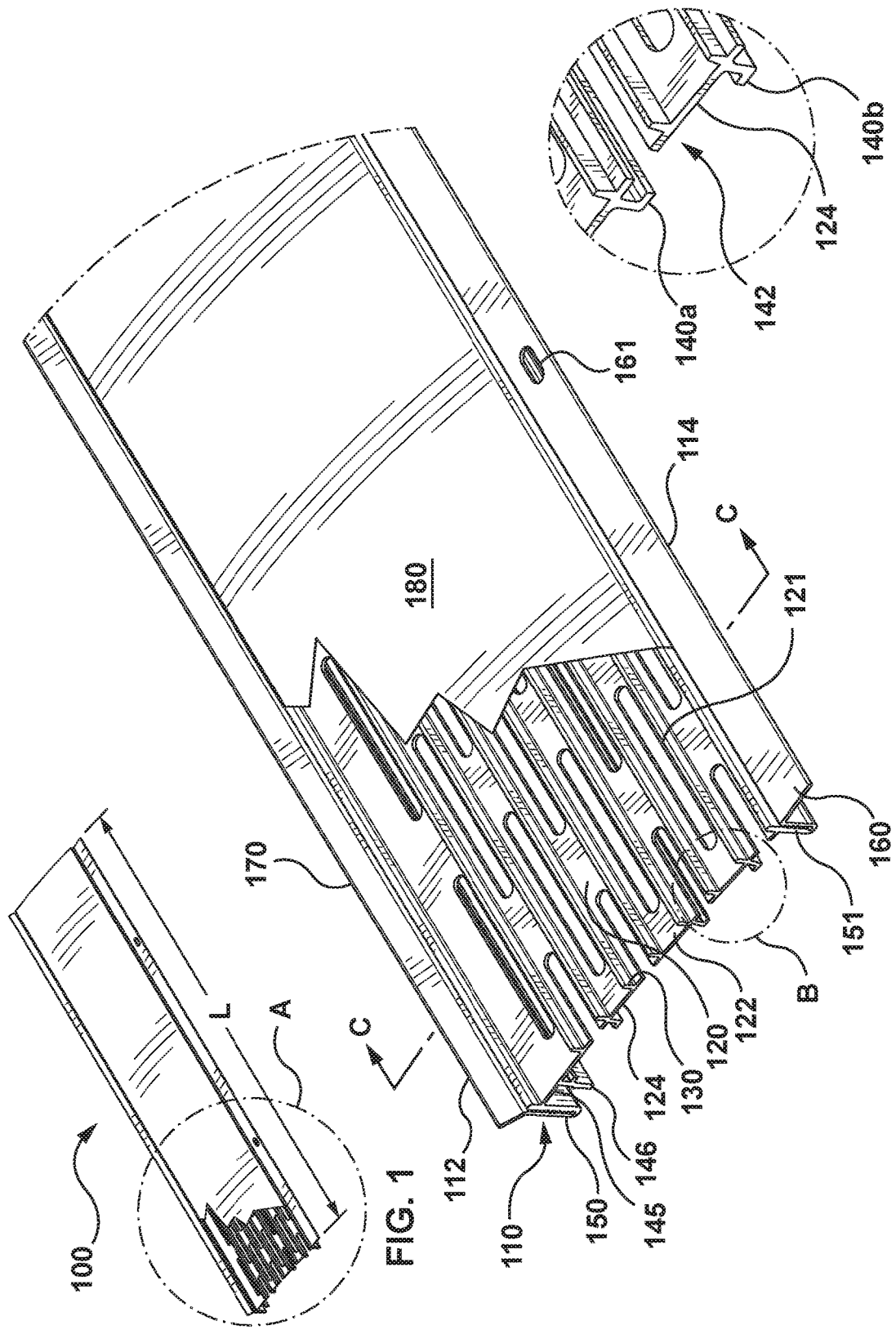

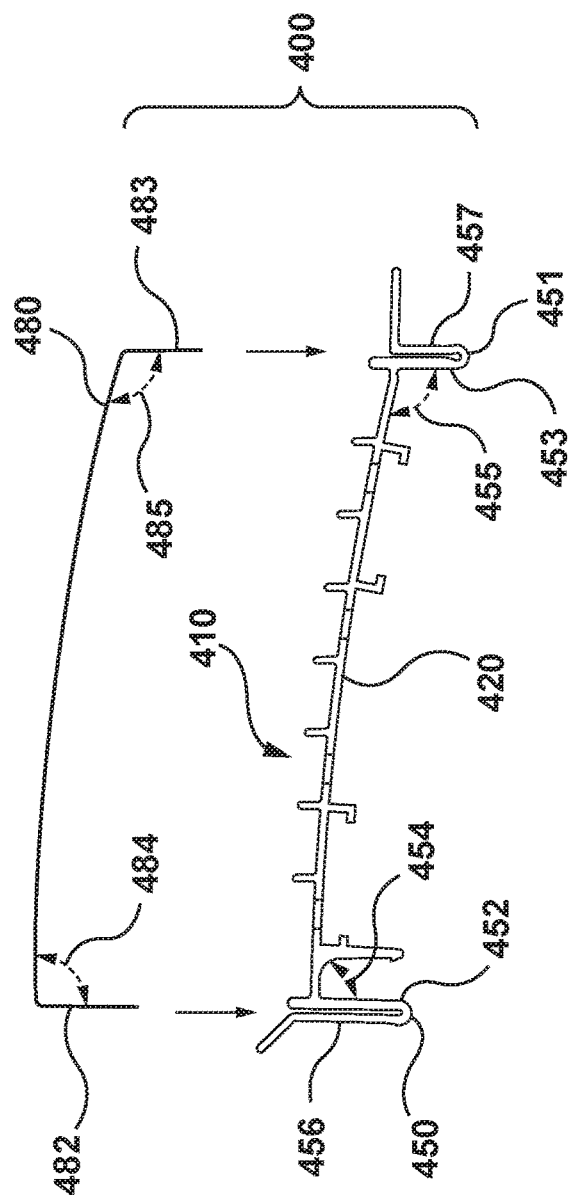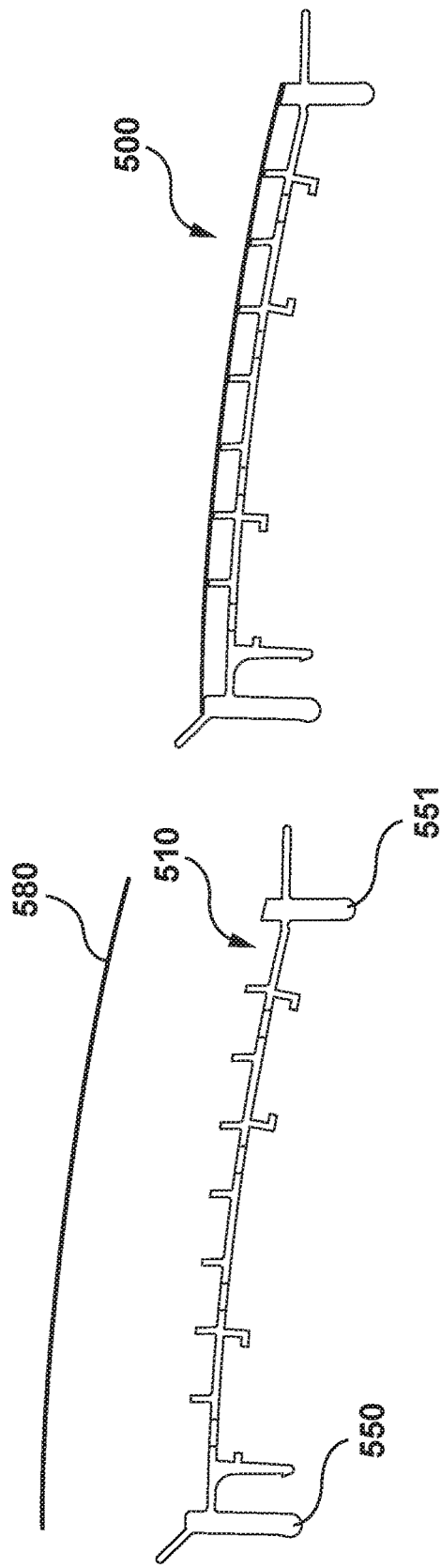

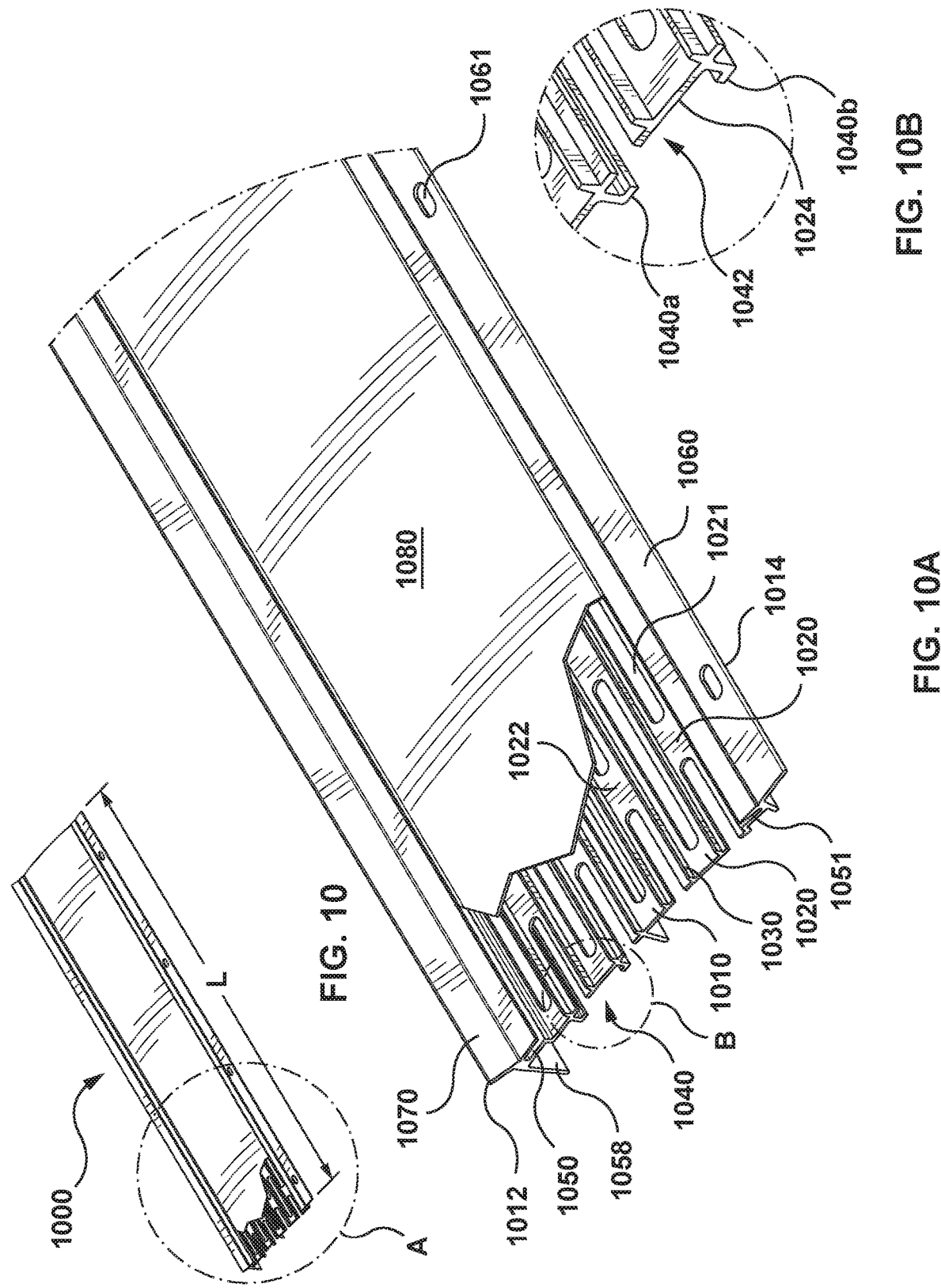

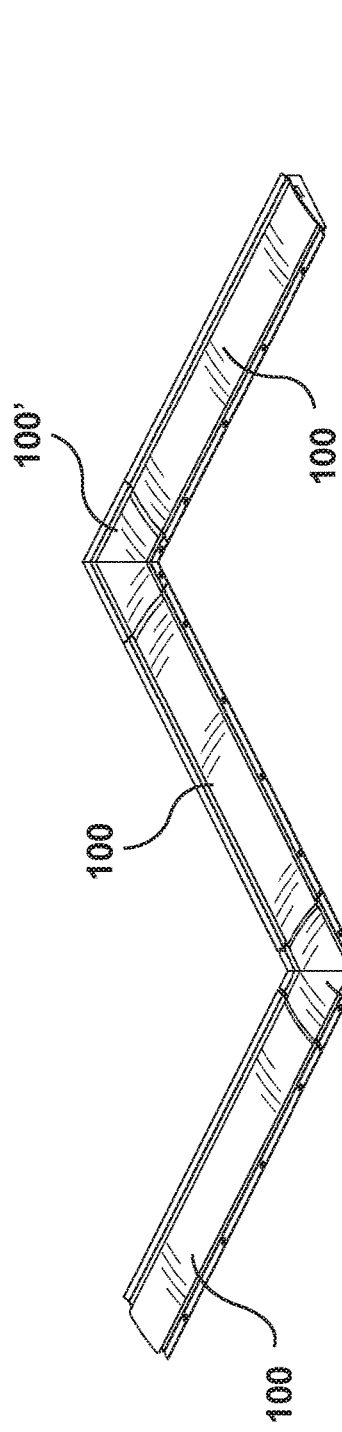
FIG. 11A
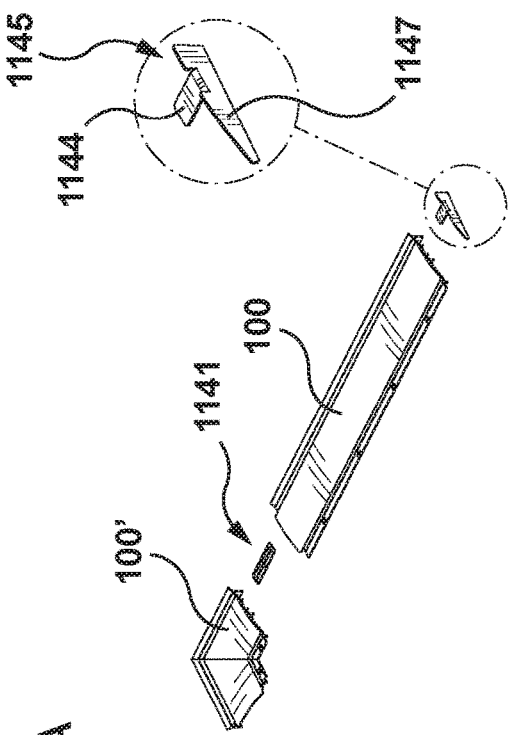
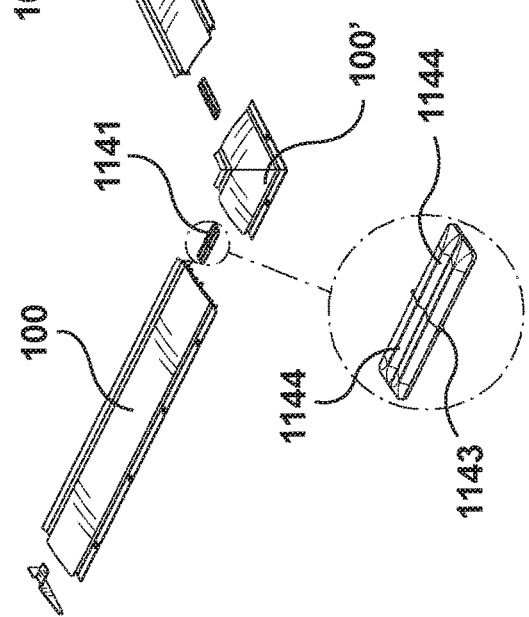
FIG. 11B

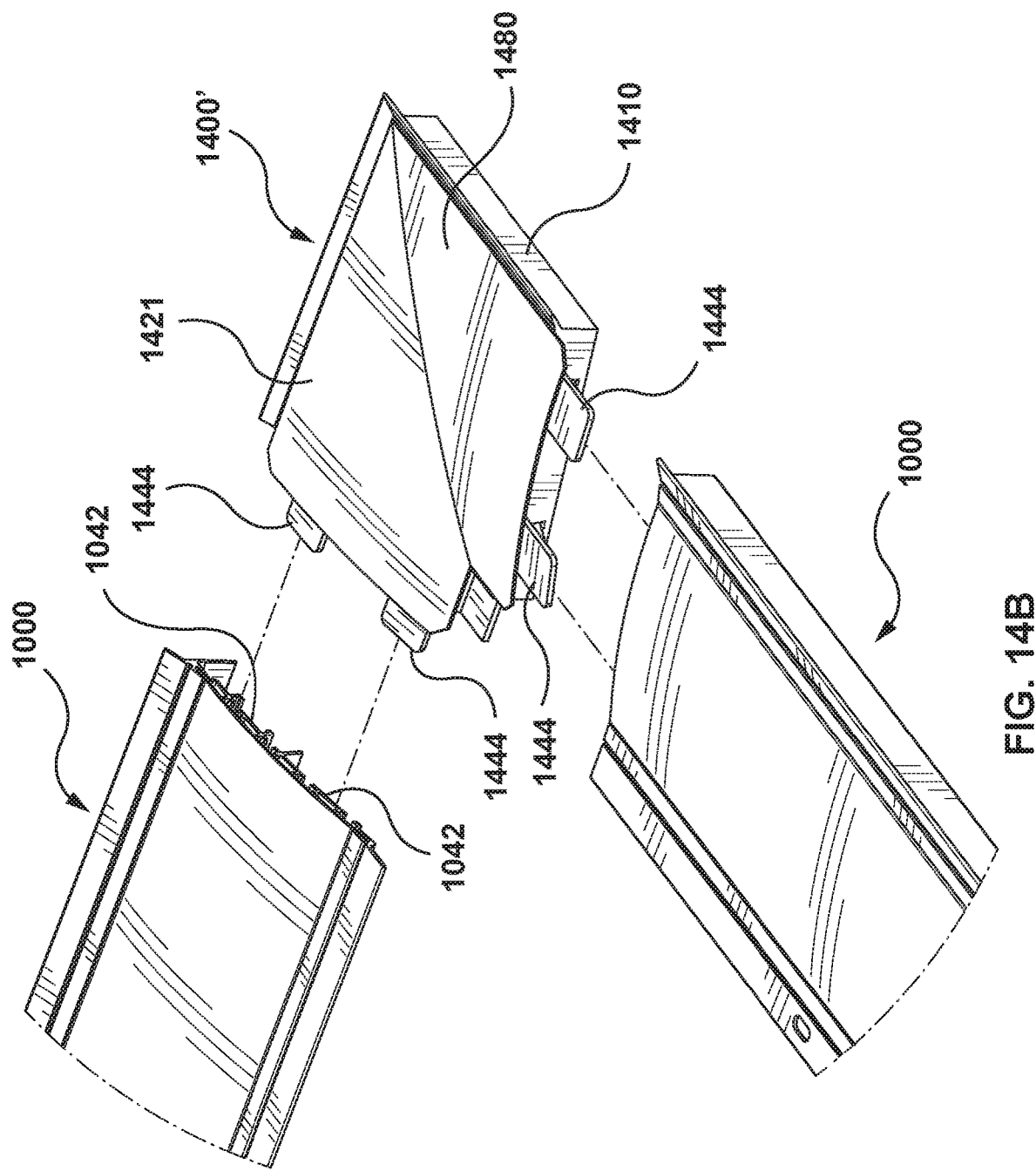

EAVESTROUGH DEBRIS GUARD

CROSS-REFERENCE TO RELATED APPLICATION

The present application claims the benefit of prior U.S. Appl. No. 62/823,993, filed Mar. 26, 2019, the content of which is incorporated by reference herein in its entirety.

FIELD OF THE INVENTION

The invention relates to a cover for an eavestrough or gutter that blocks debris from entering the eavestrough.

BACKGROUND

To protect the foundations of buildings, eavestroughs, also known as gutters, are installed under the edge of a roof to collect and manage the flow of rainwater off of the roof and away from the base of the building. Leaves, pine needles, and other debris dropped onto the roof can collect in the eavestroughs, this in turn can clog the eavestroughs and downspouts causing the rainwater to overflow the eavestrough and collect around the base of the building. Debris guards can be installed on eavestroughs to prevent the debris from entering the eavestrough while still allowing the water to flow through. Every building has a custom layout of eavestrough to match the shape of the roof line, therefore the installation of the debris guard must be customized on site to match the size and shape of the building eavestrough layout. The debris guard must be simple and quick to install, it is important to avoid misalignment and large gaps between pieces. Misalignment and gaps can become hang up areas for debris which will eventually build up and possibly clog or damage the debris guard, or they may allow for debris to pass between the pieces of debris guard into the eavestrough which can then be clogged. When eavestroughs are to be used for rainwater harvesting for grey water use any debris that passes into the eavestrough can taint the collected rainwater.

BRIEF DESCRIPTION OF THE DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 1 is a perspective view of a length of a debris guard in accordance with an embodiment hereof.

FIG. 1A is a magnification of a portion A of the debris guard of FIG. 1.

FIG. 1B is a magnification of a portion B of the debris guard of FIG. 1 identified in FIG. 1A.

FIG. 4 is an alternative manufacturing method for a debris guard in accordance with an embodiment hereof.

FIG. 5A is a cross-sectional view of a debris guard in accordance with another embodiment, showing a first manufacturing step.

FIG. 5B is a cross-sectional view showing a second step of a manufacturing method for the debris guard shown in FIG. 5A.

FIG. 10 shows a perspective view of a length of a debris guard in accordance with an embodiment hereof.

FIG. 10A is a magnification of a portion A of the debris guard of FIG. 10.

FIG. 10B is a magnification of a portion B of the debris guard of FIG. 10 identified in FIG. 10A.

FIG. 11A is a perspective view of an example layout of debris guard pieces connected together by connectors in accordance with an embodiment hereof.

FIG. 11B is an exploded perspective view of the example layout shown in FIG. 11A of a debris guard and connectors in accordance with an embodiment hereof.

FIG. 14B depicts the pre-made corner piece of debris guard from FIG. 14A with mesh.

DETAILED DESCRIPTION

Figure 2A:
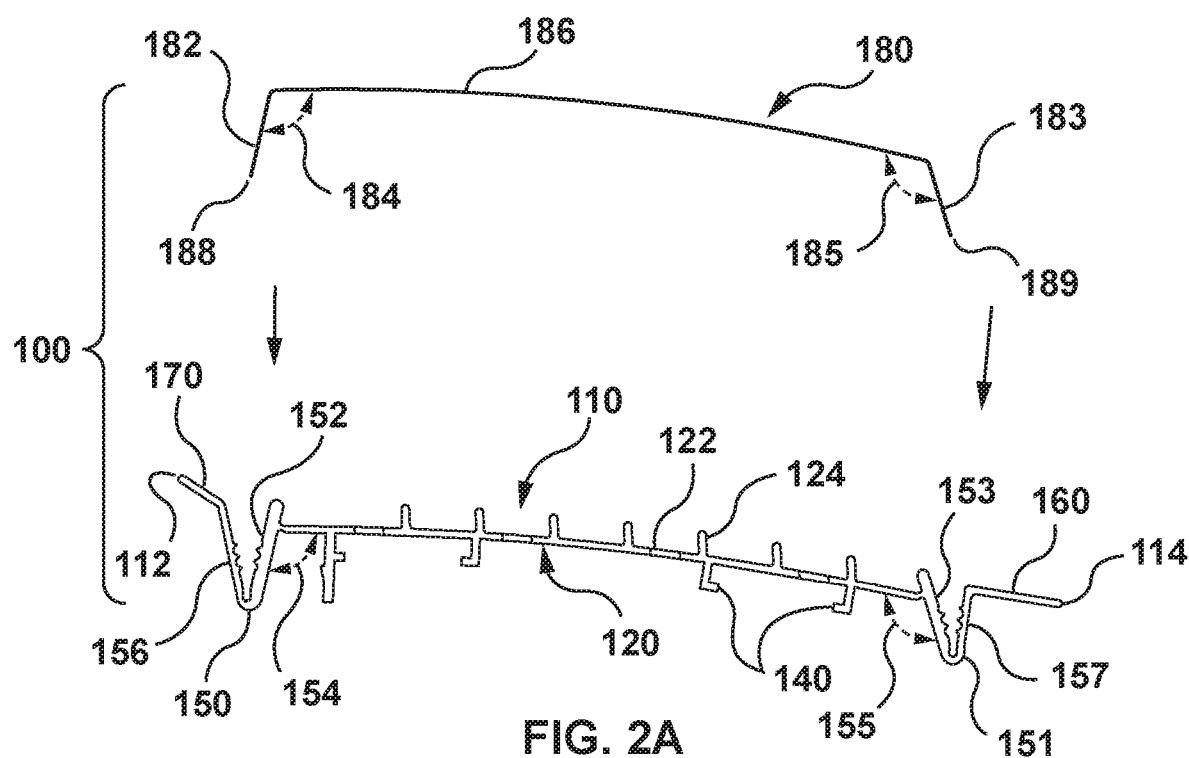
FIG. 2A is a cross-sectional exploded view of a pre-assembled debris guard shown in FIG. 1.

Specific embodiments of the present invention are now described with reference to the figures, wherein like reference numbers indicate identical or functionally similar elements. The following detailed description is merely exemplary in nature and is not intended to limit the invention or the application and uses of the invention. Directional terms used within the specification are with respect to the way in which the drawing is presented unless otherwise described. Furthermore, there is no intention to be bound by any expressed or implied theory presented in the preceding technical field, background, brief summary or the following detailed description.

FIG. 1 is a perspective view of a debris guard 100 and FIG. 1A shows a magnification of portion A, where further details of the debris guard 100 will be described. In the embodiment shown, debris guard 100 has a frame 110 and a mesh 180, which are fastened together to form the debris guard 100. In FIGS. 1 and 1A a portion of the mesh 180 is cut away purely for illustrative purposes to show the frame 110 underneath. Frame 110 has back side 112 and a front side 114 and a length L, when installed in the eavestrough the back side 112 is adjacent the building (not shown). A rear flange or lip 170 extends from the back side 112 at an angle to direct rainwater and debris from the roof (not shown) to a water collection portion 120. A first rear mesh engaging portion 150 is located forward of the rear flange 170 towards the front side 114 of the frame 110. Water collection portion 120 extends forward from first mesh engaging portion 150 to a second front mesh engaging portion 151, therefore the water collection portion 120 extends between the two mesh engaging portions 150, 151. The mesh engaging portions 150,151 extend down from and are at a roughly 90 degree angle relative to the water collection portion 120 of the frame 110. The mesh engaging portions 150,151 extend along the length of the frame 110 and receive edges of the mesh 180 to fix the mesh 180 to the frame 110 covering the water collection portion 120. Mesh engaging portions 150, 151 also provide the vertical location/position and support for the debris guard 100 when installed into the eavestrough, and therefore they will also be referred to as vertical debris guard support portions. A forward flange or eavestrough fastening portion 160 extends forward from the second front mesh engaging portion 151 and to the front side 114 of the frame 110 and along the length of the frame 110. Fastening portion 160 has holes or slots 161 for receiving a fastener such as a screw (not shown).

Frame 110 further includes mesh supports 130 extending upward from the top surface 122 of the water collection portion 120. Mesh supports 130 make contact with the mesh 180 to keep a space or gap between the mesh 180 and the top surface 122 of the water collection portion 120, this allows air flow to dry the debris guard 100. Mesh supports 130 also draw and guide the rainwater down from the mesh 180 onto the top surface 122 of the water collection portion 120 which has number of slots or holes 121 to allow the rainwater to pass through, in the embodiments shown they are elongated slot shaped but they could be any other shape. Mesh supports 130 will also prevent the mesh 180 from collapsing during use. The mesh supports 130 shown in this embodiment are roughly perpendicular to the surface of the water collection portion 120, spaced apart from each other, are straight, the same height, continuous, and extend along the length L of the debris guard 100, therefore they also in pairs form channels between them to direct the water flow along the debris guard. It should be understood that the shape, angle, height, variation in height, number and continuity of the mesh supports can be different from what is shown as long as they provide enough support to maintain the gap and prevent the collapse of the mesh 180. Increasing the contact the mesh supports 130 have with the mesh 180 will increase the water transfer rate through the mesh 180. Another way to increase the water transfer rate through the mesh 180 is to increase the surface area of the mesh 180 by providing a curved profile for the mesh 180. In this embodiment the water collection portion 120 has a slightly convex curved profile in cross-section between the two mesh engaging portions 150, 151. It is also possible to achieve a curved mesh profile with a flat water collection portion by sizing the mesh support heights to create a convex curved profile in cross-section.

Now turning to FIG. 1B a magnification of portion B on an end of the debris guard 100 from FIG. 1A, multiple pairs of connector engagement structures 140a, 140b are shown in cross-sectional profile extending downward from the bottom surface 124 of the water collection portion 120 of the frame 110 and then inward, the engagement structures 140a,140b extend along the length L of the debris guard 100. The pair of connector engagement structures 140a, 140b along with the bottom surface 124 of the frame 110 form a connector receiving opening 142 sized and shaped to receive a connector (not shown) in a snug slide fit such that the connector can be slid into and pulled out of the connector receiving opening 142 by hand or using a hand tool, but will remain located so that separate pieces or lengths of debris guard will remain vertically aligned with one another when connected together end to end by connectors. In this embodiment shown, the connector receiving opening 142 is shaped to receive a rectangular shaped connector, however it should be understood that connector receiving opening 142 can be shaped to receive various shapes of connectors, for example round, square, etc. Although connector engagement structures 140a, 140b are shown as not touching one another, in another embodiment the connector engagement structures 140a, 140b may be joined and create a fully enclosed connector receiving opening 142. The use and types of connectors will be described further in FIGS. 6, 7, and 11-17.

Frame 110 as shown in FIGS. 1 and 1A have an optional heater channel 145 for receiving a heater 148 which in some climates may be helpful to prevent ice and snow build up. Heater channel 145 is formed between a heater engagement structure 146, a portion of the bottom surface 124 of the water collection portion 120 of the frame 110, and the rear mesh engagement portion 150. The heater 148 can be of a cable, tape, and/or cord type but any other appropriate heater can be used, the cable is inserted into the heater channel 145 by press fit or may be glued or pasted in. The frame 110 which is generally made from metal, such as aluminum will conduct the heat from the rear side 112 of the frame adjacent to the heater channel 145 location through to the front side 114 of the frame. It should be understood that any of the debris guard embodiments described in this application can all be equipped with a heater channel and a heater provided that the material of the frame can handle heat generated by the heater element.

Figure 2B:
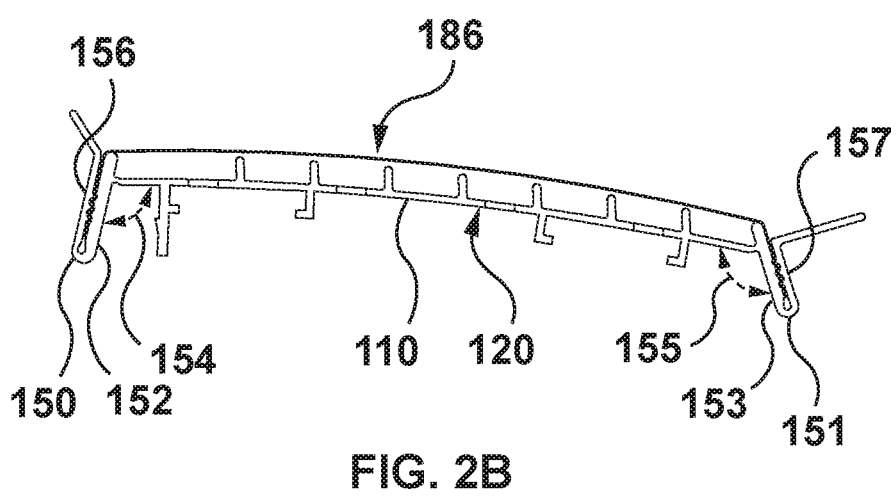
FIG. 2B is a cross-sectional view of an intermediate stage of manufacturing for the debris guard shown in FIG. 1.
Figure 2C:
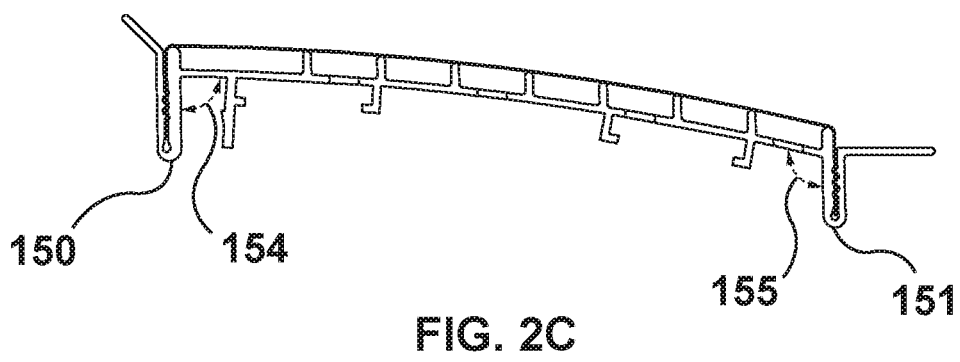
FIG. 2C is a cross-sectional view of an assembled debris guard shown in FIG. 1.

FIGS. 2A, 2B, and 2C will be used to describe the assembly and manufacturing of the debris guard 100. In FIG. 2A the mesh 180 and frame 110 of FIG. 1A is shown in cross-section C just prior to assembly. Mesh 180 can be made from woven threads of metal or plastic (for example stainless steel). The tightness of the weave and the diameter of the threads can be varied to alter the properties of the mesh 180. The thread diameter size selected impacts the rigidity or durability of the mesh. A larger diameter thread will provide more rigidity and durability while a smaller diameter thread may provide a finer mesh which is less rigid and durable. Smaller diameter thread sizes will allow a higher number of openings per square inch and smaller openings than a larger thread size. The thread size, spacing between threads, and number of openings can be selected to choose a hole size which will prevent the smallest size of typical debris from passing through while maximizing the ease in which water can pass through and the durability of the mesh, see Table 1 below for an example of a range of acceptable mesh choices.

TABLE 1

| MESH | WIRE DIAMETER | OPENING | % OPEN |
|---|---|---|---|
| 30 × 30 | 0.012" | 0.0213" | 40.80% |
| 30 × 30 | 0.0095" | 0.0238" | 51% |
| 30 × 30 | 0.0065" | 0.0268" | 64.80% |
| 32 × 32 | 0.0065" | 0.0248" | 62.70% |
| 34 × 34 | 0.0065" | 0.0229" | 60.70% |
| 36 × 36 | 0.0065" | 0.0213" | 58.70% |
| 40 × 40 | 0.010" | 0.0150" | 36% |
| 40 × 40 | 0.0065" | 0.0185" | 54.80% |
| 42 × 42 | 0.0055" | 0.0185" | 59.10% |
| 46 × 46 | 0.0055" | 0.0162" | 55.80% |
| 46 × 46 | 0.0045" | 0.0172" | 62.90% |
| 50 × 50 | 0.009" | 0.0110" | 30.30% |
| 60 × 60 | 0.0075" | 0.0092" | 30.50% |
| 62 × 62 | 0.0045" | 0.0116" | 51.70% |
| 70 × 70 | 0.0037" | 0.0106" | 54.90% |
| 72 × 72 | 0.0037" | 0.0102" | 53.80% |
| 74 × 74 | 0.0037" | 0.0098" | 52.70% |
| 76 × 76 | 0.0037" | 0.0095" | 51.70% |
| 80 × 80 | 0.007" | 0.0055" | 19.40% |
| 80 × 80 | 0.0055" | 0.0070" | 31.40% |
| 80 × 80 | 0.0037" | 0.0088" | 49.60% |
| 84 × 84 | 0.0035" | 0.0084" | 49.80% |
| 88 × 88 | 0.0035" | 0.0079" | 47.90% |
| 100 × 100 | 0.0045" | 0.055" | 30.20% |
| 105 × 105 | 0.003" | 0.0065" | 46.90% |
| 200 × 200 | 0.0016" | 0.0034" | 46.20% |
| 250 × 250 | 0.0016" | 0.0024" | 36% |
| 325 × 325 | 0.0011" | 0.002" | 42% |
| 400 × 400 | 0.001" | 0.0015" | 36% |

Prior to assembly edges of mesh 180 is pre-bent less than 90 degrees downward on both sides along its length, to form two frame engaging portions 182 and 183. Frame engaging portions 182 and 183 extend down to form obtuse angles 184 and 185 relative to the bottom surface of central covering portion 186 and terminate in the back and front side edges 188 and 189 of the mesh 180. The frame engaging portions 182,183 are sized and angled to fit into the mesh engaging portions 150,151 of the frame 110. In this embodiment as shown the angles 184 and 185 are different but they could be the same.

Frame 110 is made by metal extrusion, for example aluminum. Aluminum can be extruded, is light, and does not rust. In FIG. 2A the frame 110 is shown prior to assembly with mesh engaging portions 150 and 151 in an open state. In the open state mesh engaging portions 150 and 151 are V shaped and have inside walls 152,153 which are adjacent the water collection portion 120. Further, rear mesh engaging portion 150 has an outside wall 156 adjacent to the rear flange 170 at the back side 112, and front mesh engaging portion 151 has an outside wall 157 adjacent the eavestrough fastening portion 160 at the front side 114. In the pre-assembled state, the inside walls 152 and 153 extend down from and form obtuse angles 154,155 relative to the water collection portion 120. In this particular embodiment the angles 154,155 shown are different however they could be the same.

Figure 3:
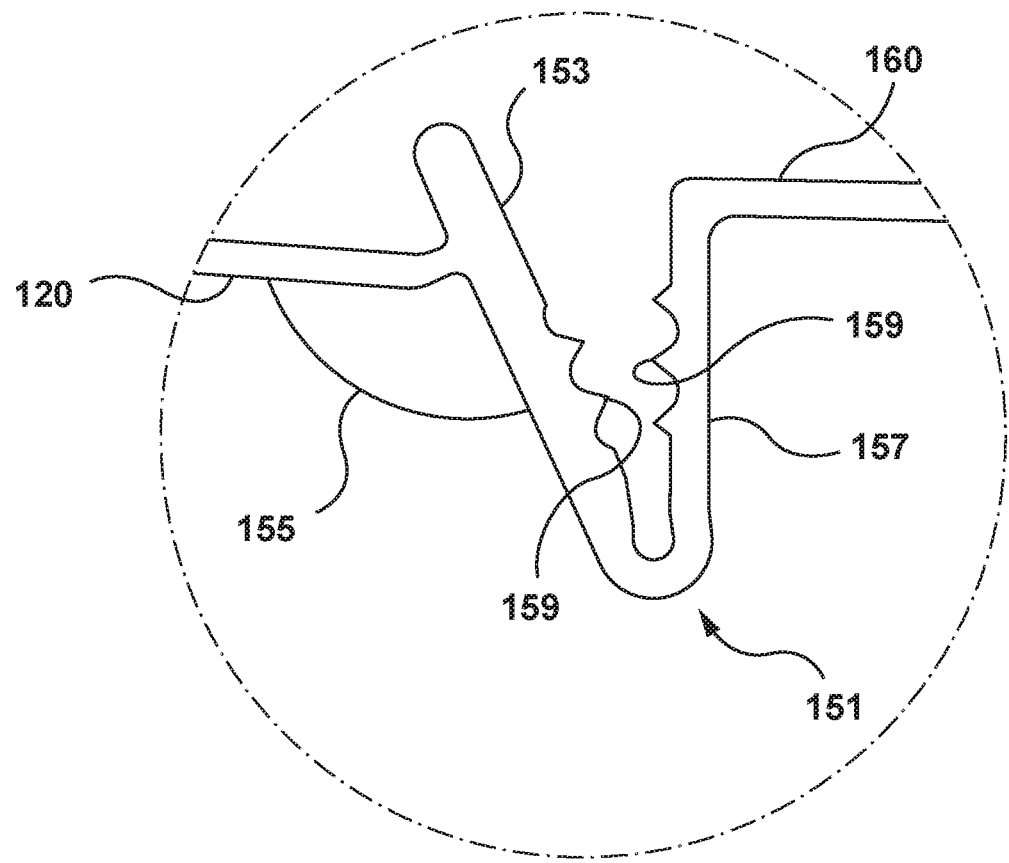
FIG. 3 is a magnification of a mesh engagement structure of FIG. 2A shown in cross-section and in an open position.

FIG. 3 shows a magnification of front mesh engaging portion 151 in the open V position from FIG. 2A to better illustrate engagement structures 159. Multiple engagement structures 159 on the inside surfaces of the inside and outside walls 153 and 157 act together to enhance the ability of the front mesh engaging portion 151 to grip/hold the frame engaging portions 183 of mesh 180 when the front mesh engaging portion 151 is closed or crimped shut. In this particular embodiment engagement structures 159 are ridges that are peak shaped in cross-section and extend along the length of the debris guard, they are located on the inside of the V on both the inside and outside walls 153 and 157. Engagement structures 159 are offset from each other in order to fit together when the front mesh engagement portion 151 is closed or crimped closed. Engagement structures 159 further engage and grip the frame engaging portions 183 of the mesh when the mesh engaging portion 157 is closed or crimped shut. It should be understood that the shape, size, number, and continuity of the engagement structures can be different as long as they allow the mesh engaging portion to be closed and provide enhanced grip or engagement of the mesh over a smooth surface; in fact a slightly roughed or textured surface may be sufficient. Although engagement structures 159 are shown with front mesh engaging portion 151 in FIG. 3, engagement structures 159 may also be formed on rear mesh engaging portion 150 shown in FIGS. 2A, 2B, and 2C. Alternatively, in accordance with another embodiment, a closed mesh engaging portion without mesh engagement structures may provide enough grip to hold the mesh to the frame.

Frame engaging portions 182, 183 of the mesh 180 are inserted into the open V shaped mesh engaging portions 150, 151. The mesh engaging portions 150, 151 are closed by bending the outside walls 156 and 157 towards their respective inside walls 152, 153 thereby closing the V as shown in FIG. 2B. Once closed, mesh engaging portions 150,151 are further bent to reduce the original obtuse angles 154 and 155 to tighten the mesh as shown in FIG. 2C. Final angles 154', 155' are approximately 90 degrees+/−10, the mesh engaging portions 150, 151 need to be at an angle such that they fit within and are received by the eavestrough when installed. Tightness of the mesh depends on the difference between original obtuse angles 154, 155 and the final angles 154', 155', the large the difference the tighter the mesh becomes. Tightening the mesh prevents collapse and low spots in the mesh, reducing the likely hood that debris will stick or hang up on the debris guard 100, as well as ensures contact with mesh supports 130 to ensure optimum transfer of water through the mesh 180.

FIG. 4 illustrates another embodiment of a debris guard 400. Final assembled debris guard 400 has essentially the same features as final assembled debris guard 100, however the manufacturing method is slightly different because there is no tightening of the mesh. Frame 410 has mesh engaging portions 450 and 451 which are roughly perpendicular to the frame 410. The frame 410 is extruded with mesh engaging portions 450 and 451, having inside walls 452, 453 with angles 454, 455 which are roughly 90° relative to the bottom surface of the water engaging portion 420 of frame 410. Mesh 480 has frame engaging portions 482 and 483, which are pre-bent at angles 484 and 485 which are roughly 90° to match the angles of the mesh engaging portions 450 and 451. Mesh engaging portions 450 and 451 receive frame engaging portions 482 and 483 to join the mesh 480 to the frame 410 to form the final assembled debris guard 400. In the embodiment shown the inside walls 452, 453 and their respective outside walls 456, 457 are both at approximately 90° relative to the frame 410 and have a space between to receive the mesh 480. The frame engaging portions 482, 483 of the mesh 480 are inserted into the mesh engaging portions 450 and 451. It should be understood that in another embodiment (not shown) it would be possible for the frame 410 to be extruded with frame engaging portions having insides walls 452, 453 at a roughly 90 degree angle but with outside walls at another angle to form an open V shape similar to the embodiment shown in FIGS. 2A, 2B, 2C and 3. In this case the mesh engaging portions would then be closed to hold the mesh.

FIGS. 5A and 5B show yet another embodiment of debris guard 500 when it is desired to have the extruded frame manufactured in its final shape and configuration, no further bending or adjustments required. What in other embodiments is described as mesh engaging portions 150, 450, 151, 451, in this embodiment no longer engages the mesh and therefore will be referred to as the alternative name vertical debris guard supports 550, 551. Vertical debris guard supports 550,551 in this embodiment only provide the vertical location and support function for the debris guard 500 when installed on the eavestrough. In the embodiment shown the frame is extruded in its final shape and configuration, mesh 580 is either welded or glued to the frame 580 to form final debris guard 500. This would be desirable when for example the frame 510 is to be made from plastic.

FIGS. 10, 10A, and 10B show another embodiment of the debris guard 1000. FIG. 10A is an enlarged view of portion A on FIG. 10 with a portion of the mesh 1080 cut away to illustrate the frame 1010 underneath. Frame 1010 has back side 1012 and a front side 1014 and a length L, when installed in the eavestrough the back side 1012 is adjacent the building (not shown). A rear flange or lip 1070 extends from the back side 1012 at an angle to direct rainwater and debris from the roof (not shown) to the water collection portion 1020. A first rear mesh engaging portion 1050 is located forward of the rear flange 1070 towards the front side 1014 of the frame 1010. Water collection portion 1020 extends forward from first mesh engaging portion 1050 to a second front mesh engaging portion 1051, therefore the water collection portion 120 extends between the two mesh engaging portions 1050, 1051. The main difference between the debris guard 1000 and the debris guard 100 described previously is that the frame 1010 has mesh engaging portions 1050 and 1051 which are parallel to the frame. The mesh engaging portions 1050, 1051 extend along the length of the frame 1010 and receive edges of the mesh 1080 to fix the mesh 1080 to the frame 1010 covering the water collection portion 1020. The mesh engaging portions 1050 and 1051 of the frame 1010 are crimped down hold the mesh 1080 to the debris guard 1080. Because the mesh engaging portions 1050, 1051 are parallel, the frame requires a separate vertical debris guard support 1058 to provide the vertical location and support function for the debris guard 1000 adjacent the back side 1012 of the frame 1010. A forward flange or eavestrough fastening portion 1060 extends forward from the second front mesh engaging portion 1051 and to the front side 1014 of the frame 1010 and along the length of the frame 1010. Fastening portion 1060 has holes or slots 1061 for receiving a fastener such as a screw (not shown).

Frame 1010 further includes mesh supports 1030 extending upward from the top surface 1022 of the water collection portion 1020. Mesh supports 1030 make contact with the mesh 1080 to keep a space or gap between the mesh 1080 and the top surface 1022 of the water collection portion 1020, this allows air flow to dry the debris guard 1000. Mesh supports 1030 also draw and guide the rainwater down from the mesh 1080 onto the top surface 1022 of the water collection portion 1020 which has number of slots or holes 1021 to allow the rainwater to pass through. Mesh supports 1030 will also prevent the mesh 1080 from collapsing during use. The mesh supports 1030 shown in this embodiment are roughly perpendicular to the surface of the water collection portion 1020, spaced apart from each other, are straight, the same height, continuous, and extend along the length L of the debris guard 1000, therefore they also in pairs form channels between them to direct the water flow along the debris guard. It should be understood that the shape, angle, height, variation in height, number and continuity of the mesh supports can be different from what is shown as long as they provide enough support to maintain the gap and prevent the collapse of the mesh 1080. Increasing the contact the mesh supports 1030 have with the mesh 1080 will increase the water transfer rate through the mesh 1080. Another way to increase the water transfer rate through the mesh 1080 is to increase the surface area of the mesh 180 by providing a curved profile for the mesh 1080. In this embodiment the water collection portion 1020 has a slightly convex curved profile in cross-section between the two mesh engaging portions 1050, 1051. It is also possible to achieve a curved mesh profile with a flat water collection portion by sizing the mesh support heights to create a convex curved profile in cross-section.

Now turning to FIG. 10B a magnification of portion B on an end of the debris guard 1000 from FIG. 10A, multiple pairs of connector engagement structures 1040a, 1040b are shown in cross-sectional profile extending downward from the bottom surface 1024 of the water collection portion 1020 of the frame 1010 and then inward towards each other, the engagement structures 1040a,1040b extend along the length L of the debris guard 1000. The pair of connector engagement structures 1040a, 1040b along with the bottom surface 1024 of the frame 1010 form a connector receiving opening 1042 sized and shaped to receive a connector (not shown) in a snug slide fit such that the connector can be slid into and pulled out of the connector receiving opening 1042 by hand or using a hand tool, but will remain located so that separate pieces or lengths of debris guard will remain vertically aligned with one another when connected together end to end by connectors. In this embodiment shown, the connector receiving opening 1042 is shaped to receive a rectangular shaped connector, however it should be understood that connector receiving opening 1042 can be shaped to receive various shapes of connectors, for example round, square, etc.

Figure 17:
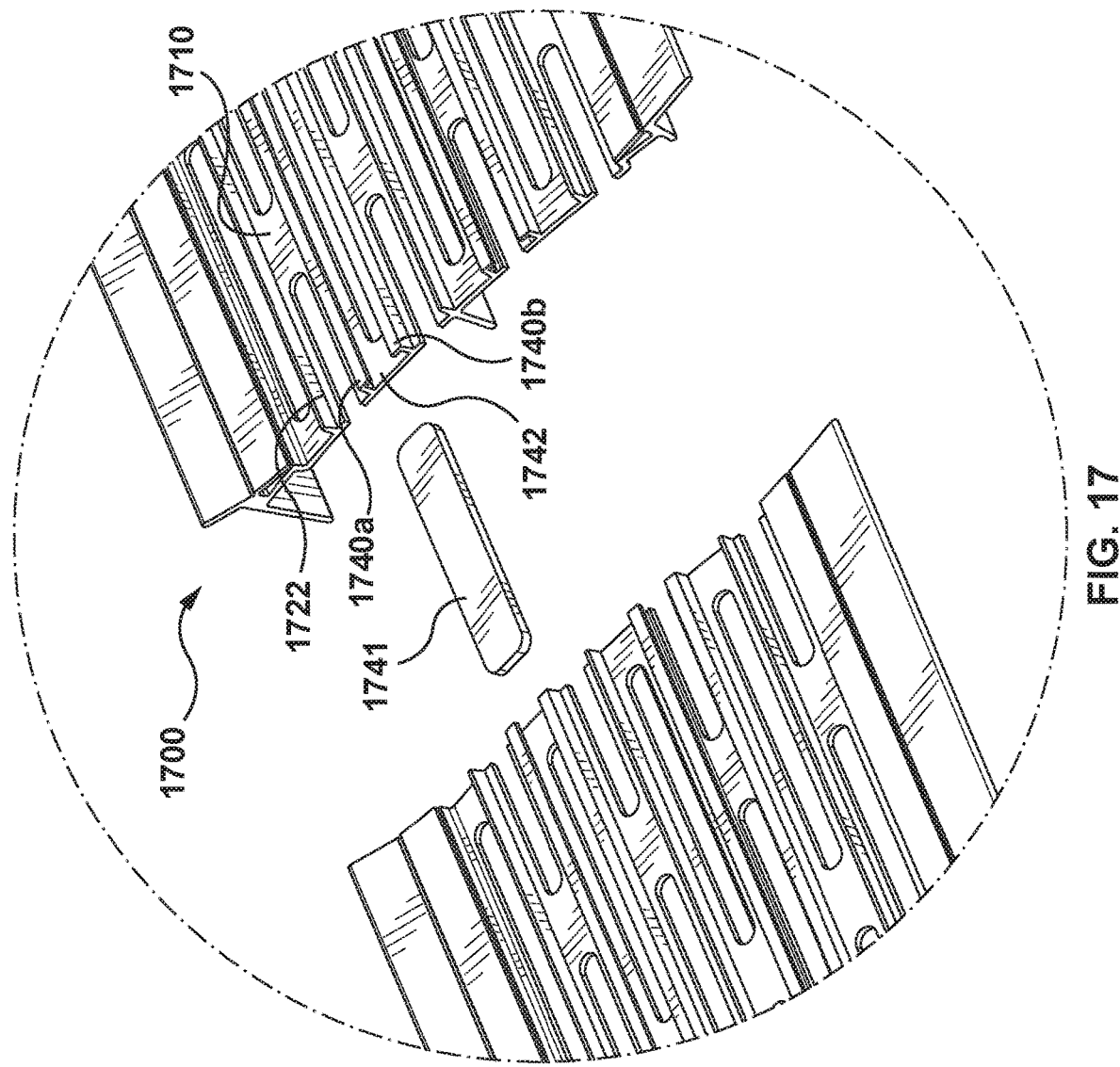
FIG. 17 is a perspective view of another embodiment of a debris guard and connector.

FIG. 17 shows an embodiment of a debris guard 1700 (with the mesh removed) similar to FIG. 10, the main difference being that the connector engagement structures 1740a and 1740b extend from the top surface 1722 of the frame 1710 instead of the bottom surface. The pair of connector engagement structures 1740a, 1740b along with the top surface 1722 of the frame 1710 form a connector receiving opening 1742 sized and shaped to receive a connector 1741 in a snug slide fit such that the connector can be slid into and pulled out of the connector receiving opening 1742 by hand or using a hand tool, but will remain located so that separate pieces or lengths of debris guard will remain vertically aligned with one another when connected together end to end by connectors.

Figure 6:
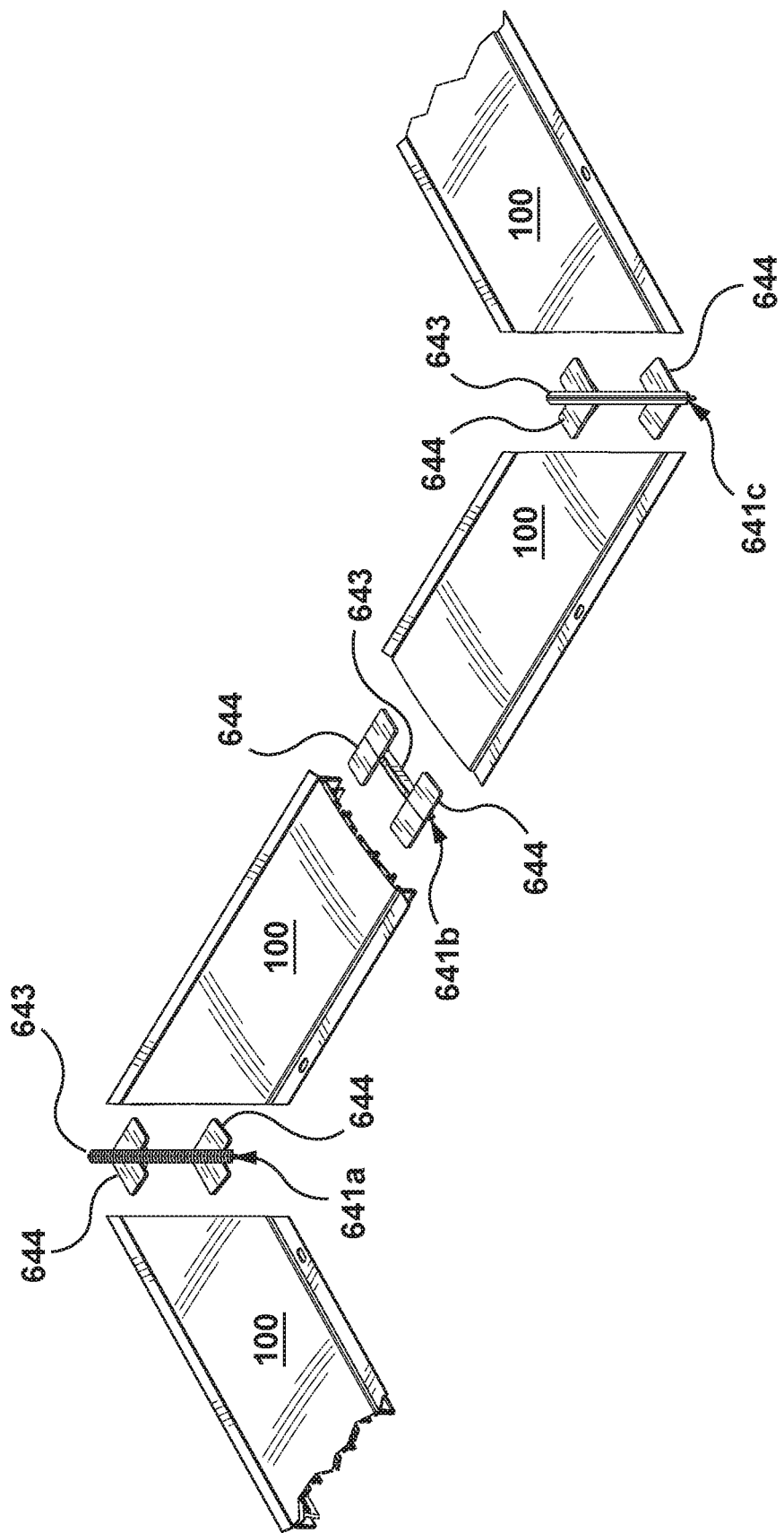
FIG. 6 is an exploded perspective view of an example layout of a debris guard and connectors in accordance with an embodiment hereof.

Debris guards can be made manufactured in many different lengths and then cut to suit by the installer on site at the building at the time of installation. For simplicity purposes the following descriptions related to connecting pieces of debris guard together and illustrated in FIGS. 6, 7 and 11-14B will refer to debris guard 100 or 1000, but it should be understood that this description applies to all embodiments of debris guards shown and/or described in this application for example but not limited to debris guards 100, 400, 500, and 1000, or any debris guard having at least one pair of connector engagement structures extending down from a bottom surface of the frame and along the length of a debris guard. Connector engagement structures must extend along the length of the debris guard because the debris guard can be cut at any point along its length to fit the length of eavestrough by the installer. FIG. 6 shows an example of debris guards 100 cut to desired lengths and angles to fit an example eavestrough layout. Connectors 641a, 641b, 641c can be used to join multiple pieces of debris guard 100 together. By using connectors between the lengths or pieces of debris guards 100 additional strength and rigidity is achieved for the installed debris guard as well as ensuring that the pieces of debris guard are aligned flush with one another. Eavestrough hanger brackets are typically installed 16-24 inches apart and therefore will not necessarily be aligned with the locations where separate pieces of debris guard will have to come together. If the ends of the separate debris guard pieces are not supported by an eavestrough hanger bracket then they will subject to misalignment, especially in climates subject to snow and ice which would add load to the debris guard. By adding the connector, it ensures that the joint is supported, and the pieces remain aligned. Connector 641a is connecting two angled ends of debris guards 100 to create a 90 degree inside angle. Connector 641b is connecting two straight edge ends of debris guards 100 to continue a straight length. Connector 641c is connecting two angled ends of debris guards 100 to create a 90 degree outside angle. Connectors 641a, 641b, 641c all have a main or central body portion 643 and fastener portions 644 extending from. In this particular embodiment the connectors 641a,b,c have four fastener portions 644 each, two extending from each side of the central body portion 643, it should be understood that they could have as little as two fastener portions, one on each side the central body or more than four. Each tab 644 is received between a pair of connector engagement structures 140a, 140b on the debris guard 100, which were first described in FIG. 1B and will be further described in FIGS. 8 and 9. When the connectors 641a, 641b, 641c are fully inserted into the debris guards 100, the central body 643 of the connectors 641a, 641b, 641c will make contact with and act as a stop for the edge of the debris guard 100 lengths.

Figure 7:
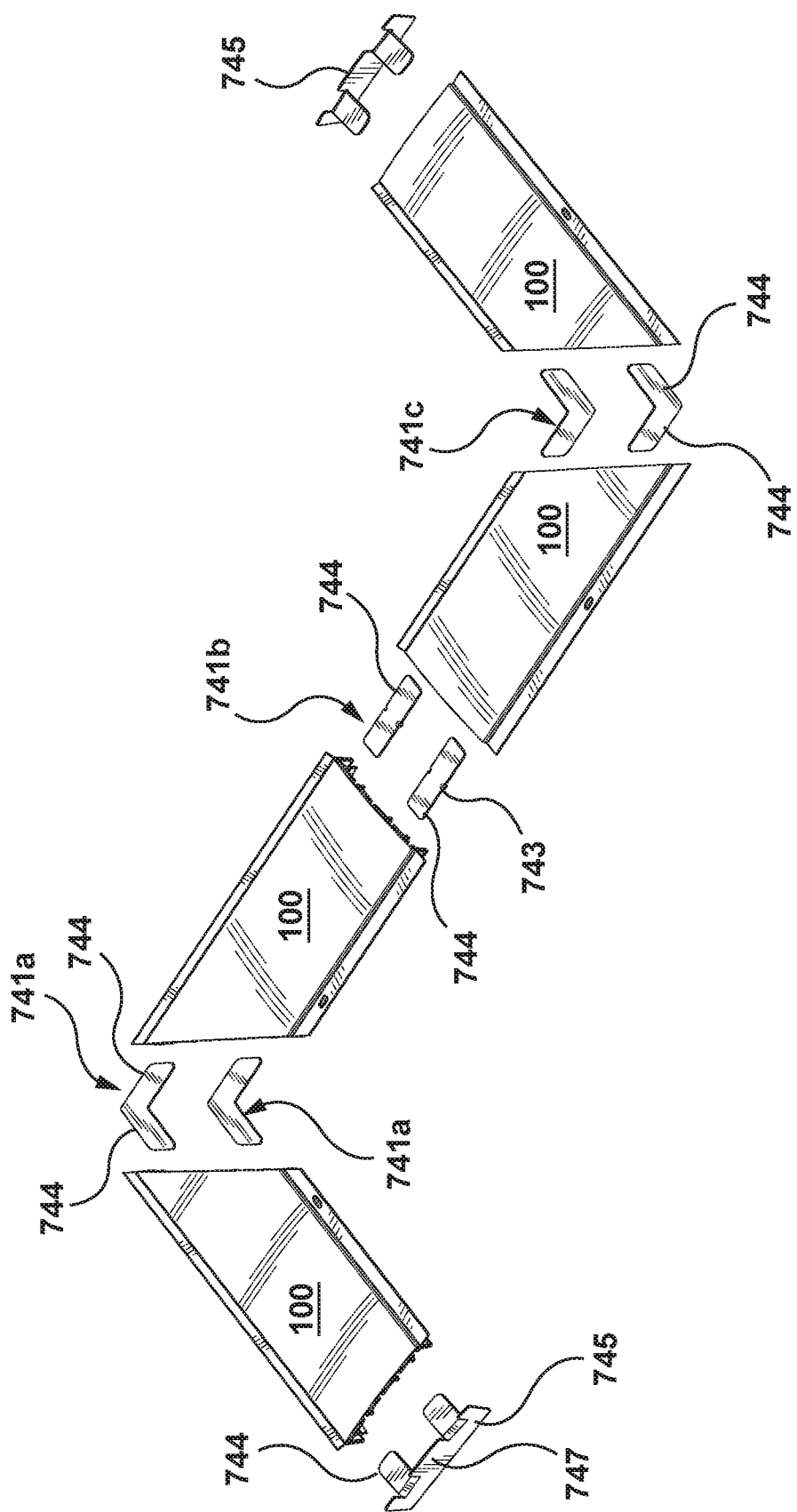
FIG. 7 is an exploded perspective view of an example layout of a debris guard and another embodiment of connectors in accordance with an embodiment hereof.

FIG. 7 illustrates the same example layout as shown in FIG. 6 but with a different style of connectors. Two substantially L shaped connectors 741a are used to connect two angled ends of debris guards 100 to create a 90 degree inside angle; each connector 741a has two fastener portions 744 one received in one piece of the debris guard 100, the other in a second piece of debris guard 100. Two substantially L shaped connectors 741c are used to connect two angled ends of debris guards 100 to create a 90 degree outside angle; each connector 741c has two fastener portions 744 one received in one piece of the debris guard 100, the other in a second piece of debris guard 100. Connector 741b is connecting two straight edge ends of debris guards 100 to continue a straight length. Connector 741b also has two fastener portions 744, one received in an end of a first length of debris guard 100 and the other received in an end of a second length of debris guard, bumps/crimps 743 in the center of the connector 741b act as a stop for the edge of the debris guard 100 lengths to prevent them from touching or overlapping. It is possible to add similar bumps/crimps to the angle connectors 741a and 741b. Each fastener portion 744 is received between a pair of connector engagement structures 140a, 140b on the debris guard 100, which were first described in FIG. 1B and will be further described in reference to FIGS. 8 and 9. Although two connectors 741a, 741b, 741c are shown between pieces of debris guard 100 it should be understood that it is possible to have only one or more that two. FIG. 7 also shows end caps 745 which can be attached to cut ends of the debris guard 100 to cover the cut end of the debris guard 100 pieces or lengths. It is possible that rough edges may be created when the lengths of debris guard are cut. End cap 745 shown has an end surface 747 with fastener portions 744 which extend perpendicular from the end surface 747. Fastener portions 744 are shaped to be received in the connector engagement structures 140a, 140b on the debris guard 100 and end surface 747 covers the cut edge of debris guard 100.

FIG. 11 illustrates a similar layout as shown in FIGS. 6 and 7 however instead of using angled connectors, the debris guard comes in debris guard straight lengths 100 which are cut and pre-made corners 100'. The benefit to the pre-made corners 100' is that the installer will only need to make straight cuts of the debris guard and will not be required to cut any angles. Because all ends of debris guard 100 and 100' are straight edges the connectors can also be straight along their length and only one type and size of connector is needed. Connector 1141 has two fastener portions 1144 one received in one piece of the debris guard 100/100', the other in an end of a second piece/length of debris guard 100/100', bumps/crimps 1143 in the center of the connector 1141 act as a stop for the edge of the debris guard 100 lengths to prevent them from touching or overlapping. Connector 1141 is shown connecting two straight edge ends of debris guards 100 to continue a straight length, as well as showing a connection between a straight length 100 and a pre-made corner 100'. Each fastener portion 1144 is received between a pair of connector engagement structures (not shown) on the debris guard 100, engagement structures were first described in FIGS. 1B and 10B and will be further described in reference to FIGS. 8 and 9. Although only one connector 1141 between pieces of debris guard 100, 100' are shown however it is possible to have a debris guard with more than one pair of connector engagement structures use two or more connectors 1141. FIG. 11 also shows end caps 1145 which can be attached to cut ends of the debris guard 100 to cover the cut end of the debris guard 100 pieces or lengths. It is possible that rough edges may be created when the lengths of debris guard are cut, end caps cover the rough edges to prevent debris hang up as well as prevent entry of rodents, debris, insects, birds, etc. into the eavestrough. End cap 1145 shown has an end surface 1147 with fastener portion 1144 which extend perpendicular from the end surface 1147. Fastener portions 1144 on the end cap 1145 are the same as fastener portions 1144 and shaped to be received in the connector engagement structures on the debris guard 100 such that end surface 1147 covers the cut edge of debris guard 100.

Figure 12:
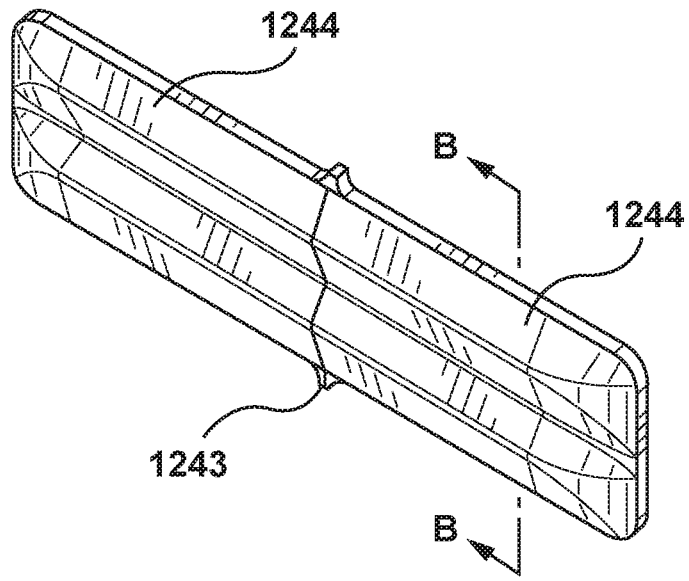
FIG. 12 is a perspective view of a connector in accordance with an embodiment hereof.
Figure 12A:
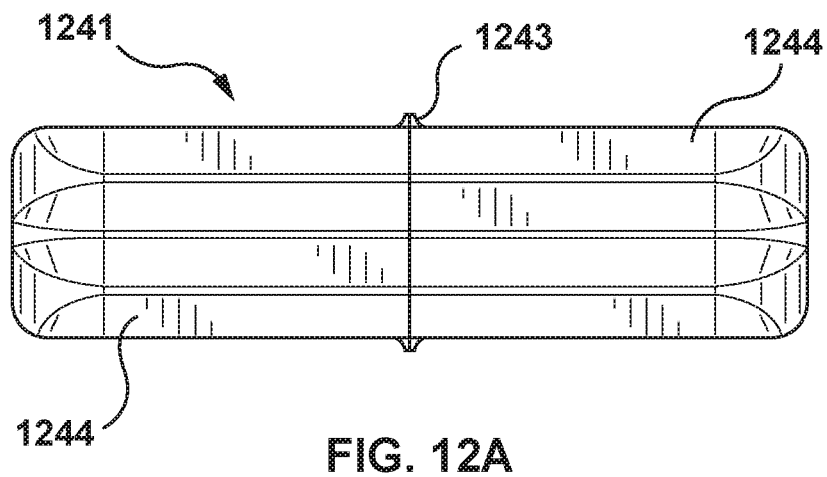
FIG. 12A is a top view of the connector of FIG. 12.
Figure 12B:
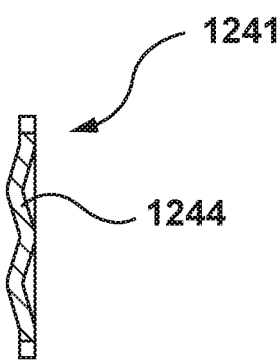
FIG. 12B is a cross-section through section B-B in FIG. 12.

FIGS. 12, 12A, and 12B, show an example of a connector 1241 that could be used with any of the debris guards described herein. Connector 1241 has two fastener portions 1244 one to be received in one piece of the debris guard and the other another piece of debris guard to join them together. Each fastener portion 1244 extends outward from a central portion 1243 which is shaped to be slightly larger in profile then the fastener portions 1244 so that central portion be larger than the connector receiving opening (not shown) in the debris guard (not shown). This ensures a stop between pieces of connected debris guard so that they are unable to crush against each other and ensures that substantially equal amounts of fastener portions 1244 extend into each piece of debris guard. The fastener portions 1244 provide additional rigidity and support to connected pieces of debris guard. As illustrated in FIG. 12B connector 1241 has a slightly wavy cross-section, the wave shape forms ridges and valleys which enhance the overall strength of the connector 1241, which in turn translates into further rigidity and strength to connected pieces of debris guard. This is an optional enhancement and could be achieved using other geometries.

Figure 13A:
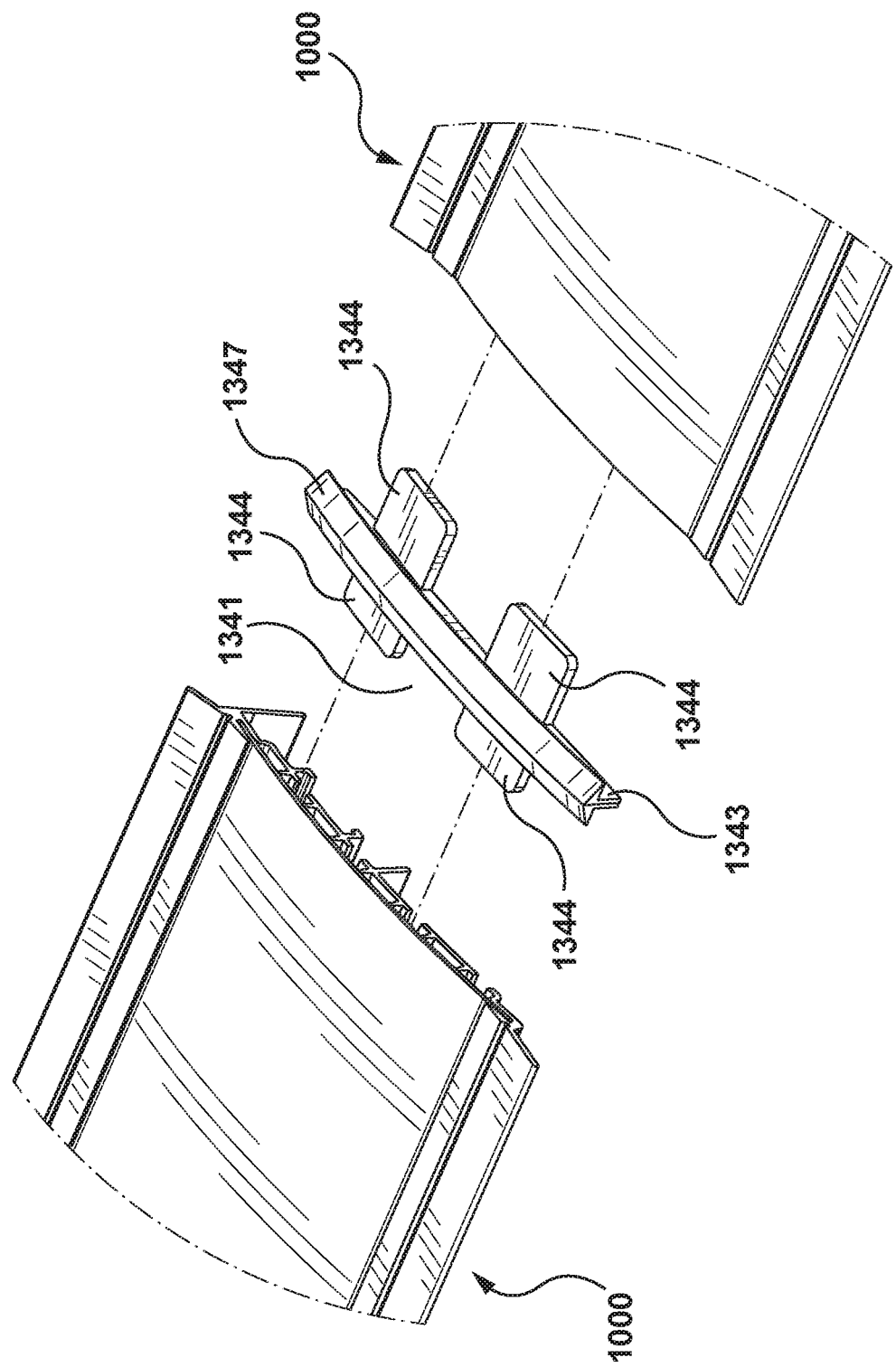
FIG. 13A is a perspective exploded view of a connector in accordance with an embodiment hereof.
Figure 13B:
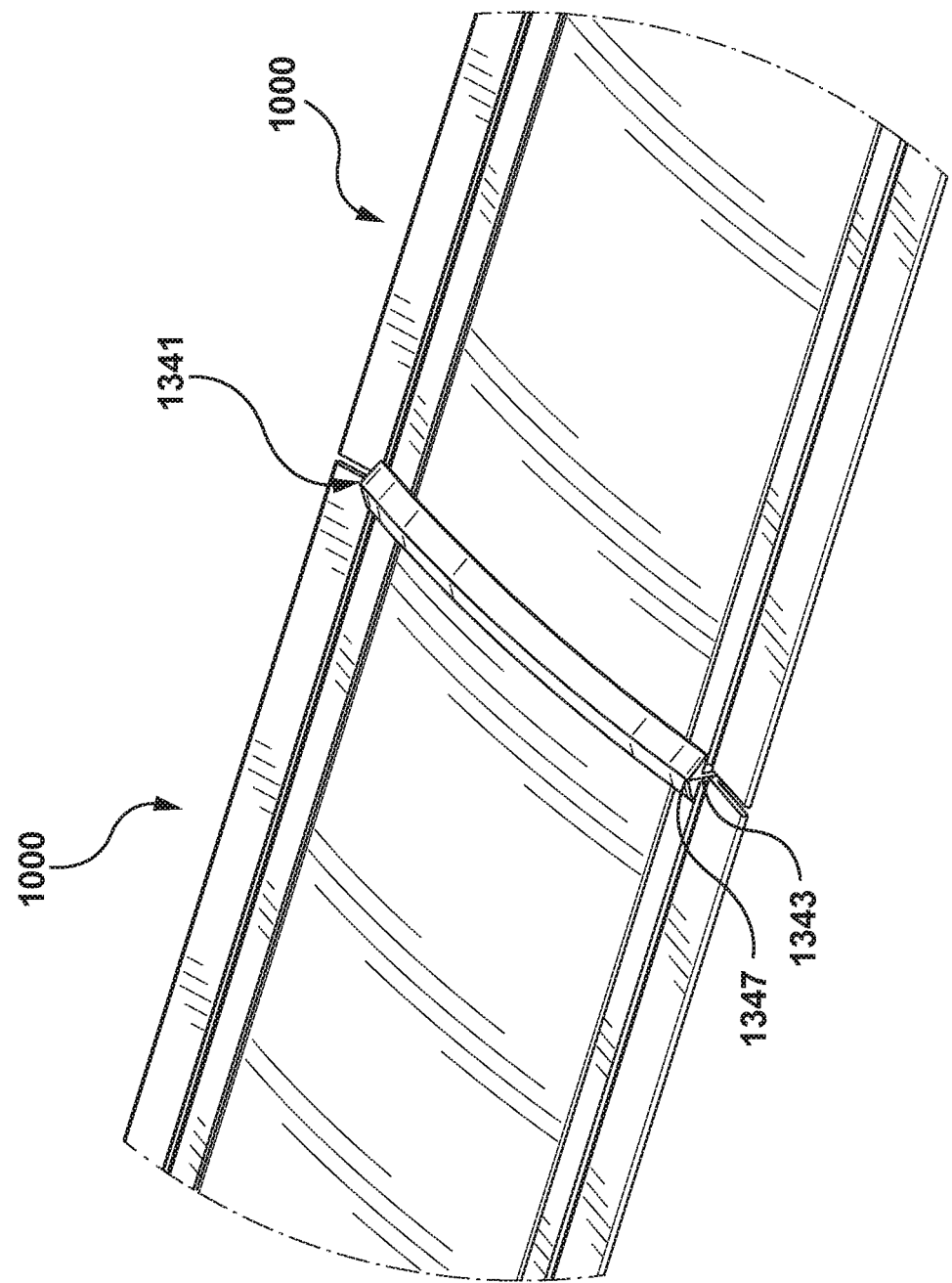
FIG. 13B is a perspective view of connector of FIG. 13A connecting two pieces of debris guard in accordance with an embodiment hereof.

FIGS. 13A and 13B show another embodiment of a connector 1341, FIG. 13A shows the connector 1341 just prior to joining two pieces of debris guard 1000 together. Connector 1341 has a central portion 1343 with two fastener portions 1344 spaced apart and extending outwardly from each side of the central portion 1343. The central portion 1343 extends upward from the connector 1341 to a height that will clear the top of the debris guard 1000 when installed, once past this height the central portion 1343 widens to form a joint covering portion 1347. When the connector 1341 is installed as shown in FIG. 13B to connect two lengths of debris guard 1000 the joint covering portion 1347 covers the cut edges of the debris guard 1000 lengths. Covering the edges may help prevent the rough edges from catching leaves and other debris and prevent debris from passing between the joined lengths of debris guard. The central portion 1343 which is located between the joined debris guard 1000 pieces acts as a stop to prevent overlapping of the debris guard pieces 1000. Although this example shows two fastener portions 1344 per side of the connector 1043, it could still work with a single fastening portion per side or more that two.

Figure 14A:
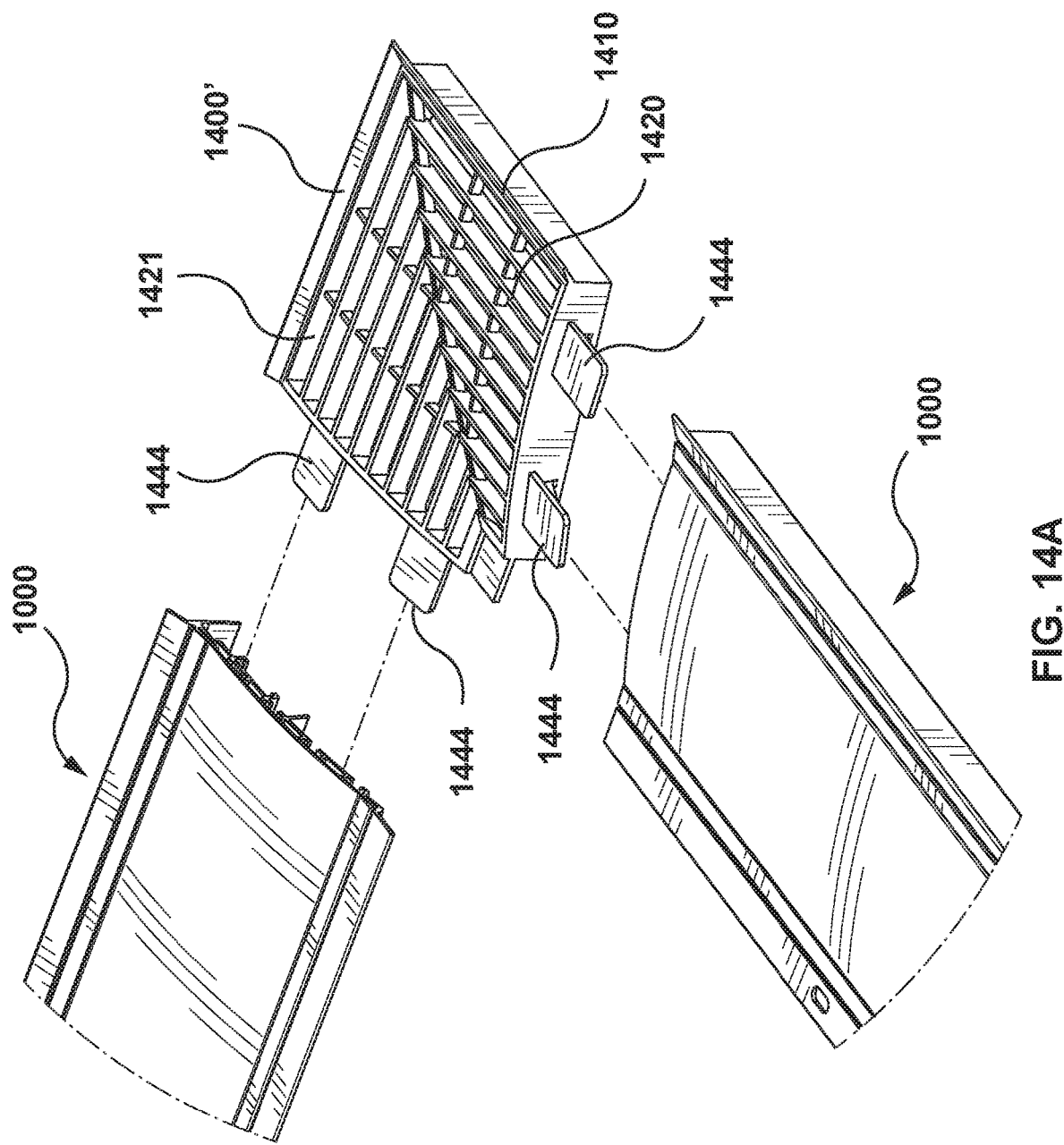
FIG. 14A is an embodiment of a pre-made corner piece of debris guard without mesh in accordance with an embodiment hereof.

FIGS. 14A and 14B illustrate another debris guard pre-made corner 1400' embodiment that does not require separate connectors to join to straight lengths of debris guard 1000, and instead the debris guard pre-made corner 1400' has its own integrated fastener portions 1444 and therefore acts as a connector to join it to straight lengths of debris guard. An outside 90 degree pre-made corner 1400' is shown in this example. Pre-made corner 1400' is shown without a mesh layer in FIG. 14A to illustrate the frame 1410 having a rainwater collection portion 1420 with openings 1421 to allow rainwater to pass through, extending from the corner piece are fastener portions 1444, two on each inside side. Fastener portions 1444 are received into connector receiving openings 1042 (as previously described in reference to FIGS. 10, 10A, and 10B) on each piece of straight debris guard lengths 1000. FIG. 14B shows pre-made corner 1400' with the mesh 1480 attached to the frame 1410 covering the rainwater collection portion (not shown).

Although the connector embodiments described and illustrated previously show fastener portions which are rectangular or tab shaped it should be understood that it is possible to for connectors to have fastener portions that are other shapes for example cylindrical, tapered, triangular, etc. Connectors should also be designed so that their overall installed profile is such that they minimize the chance to create hang up spots for debris.

Figure 15A:
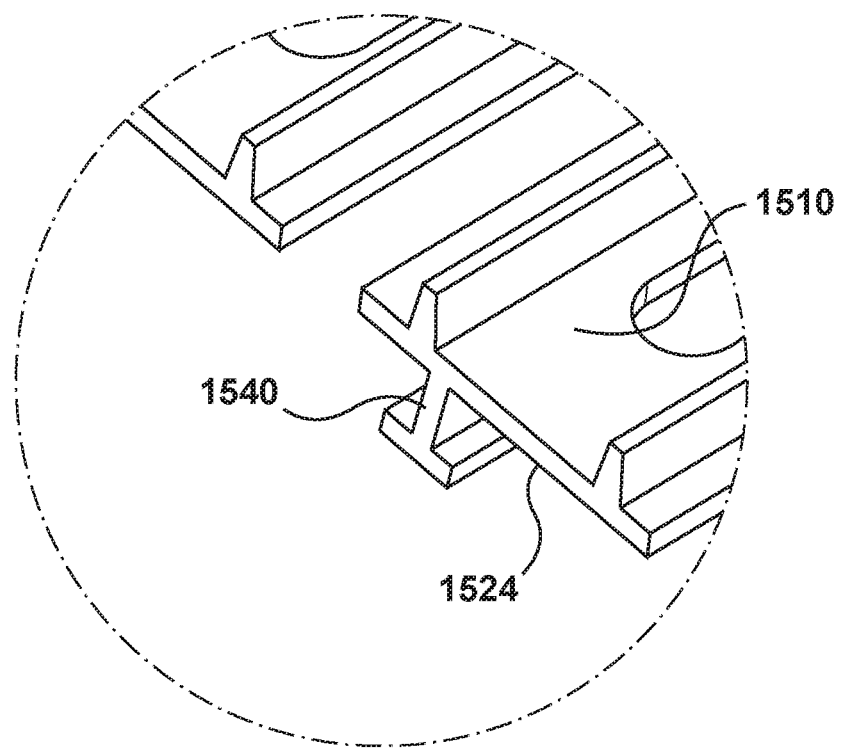
FIG. 15A depicts a connector engagement structure for a debris guard in accordance with an embodiment hereof.
Figure 15B:
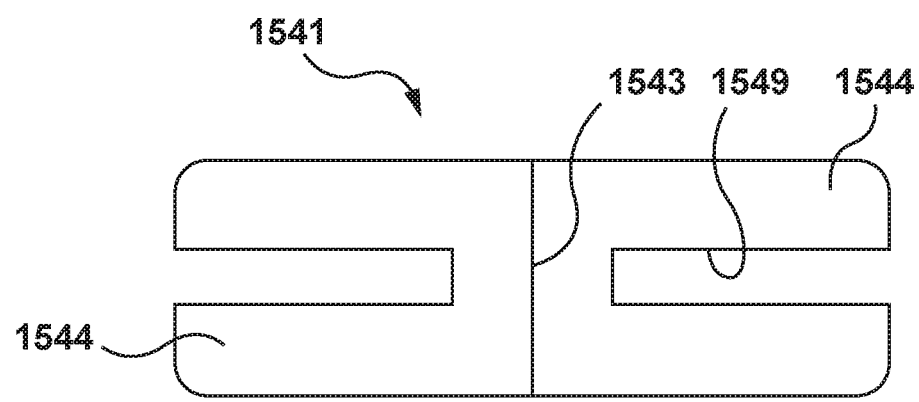
FIG. 15B is a top view of a connector in accordance with an embodiment hereof.

All connector embodiments described thus far require a pair of connector engagement structures however it is possible to have a connector that will work with a single connector engagement structure as illustrated in FIGS. 15A and 15B. FIG. 15B shows a connector 1541 that will work with debris guards having a single connector engagement structure 1540 shown in FIG. 15A. Connector engagement structure 1540 extends straight down from the bottom surface 1524 of frame 1510 and then extends outward to form a T shape in cross-section. Connector 1541 has a central portion 1543 and two fastener portions 1544 extending outwardly, one fastener portion 1544 to be received in one piece of the debris guard and the other fastener portion 1544 to be received in another piece of debris guard to join them together. Each fastener portion 1544 has a cut-out or slot 1549 which is sized and shaped to receive the connector engagement structure 1540 in a snug slide fit such that the connector can be slid onto and pulled off of the connector engagement structure 1540 by hand or using a hand tool, but will remain located so that separate pieces or lengths of debris guard will remain vertically aligned with one another when connected together end to end by connectors. The central portion 1543 is solid and therefore provides a stop between the fastener portions 1544 to prevent the connected pieces of debris guard from overlapping. In this embodiment the connector engagement structure 1540 has a T shaped in cross-section but it could be a different shape as long as it is matched to the slot or cut-out 1549 in the connector 1541 to hold and locate the connector in place relative to the frame 1510.

Figure 16:
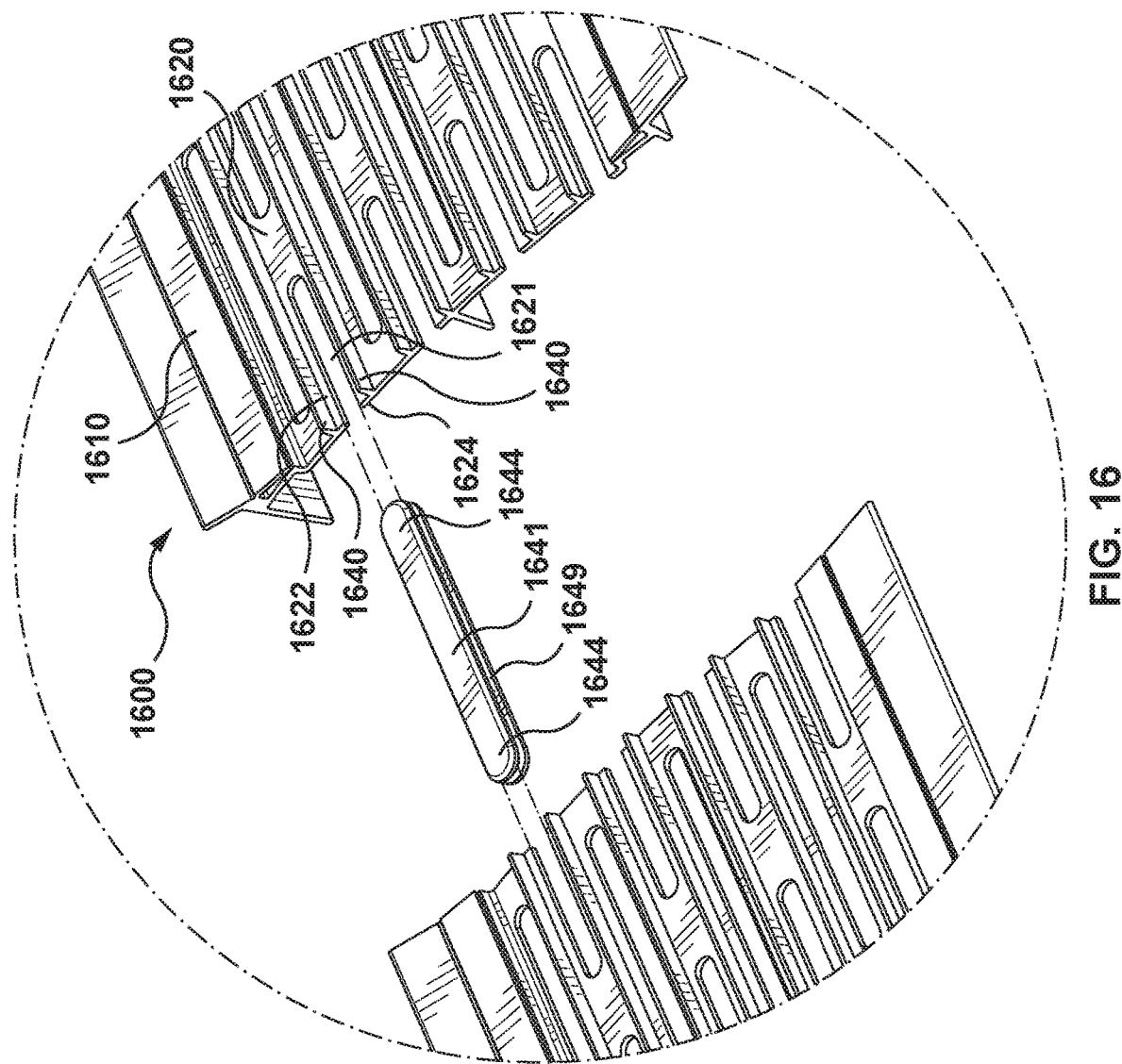
FIG. 16 is a perspective view of another embodiment of a debris guard and connector.

FIG. 16 shows an embodiment of a debris guard 1600, having a frame 1610 with a water collection portion 1620, the water collection portion having slots or holes 1621 for allowing rainwater to pass through, a top surface 1622 and a bottom surface 1624. The frame 1610 having a pair of spaced apart connector engagement structures 1640 extending up from the top surface 1622 of the water collection portion 1620 of the frame 1610. The connector 1641 shown has fastener portions 1644 on each end for engaging with two separate pieces of debris guard 1610 to connect them together. Connector 1641 further has a cut-out 1649 which in this embodiment is a slot which runs along the outside side surface of the connector 1641 including the faster portions 1644. Connector 1641 is inserted between connector engagement structures 1640 so that the cut-out 1649 is received into slot 1621 such that when installed a portion of the connector 1641 is above the top surface 1622 and a portion of the connector 1641 is below the bottom surface 1624 of the frame 1610. Similar to previous embodiments described herein, the connector 1641 has a snug slide fit engagement with the debris guard 1600.

Figure 8:
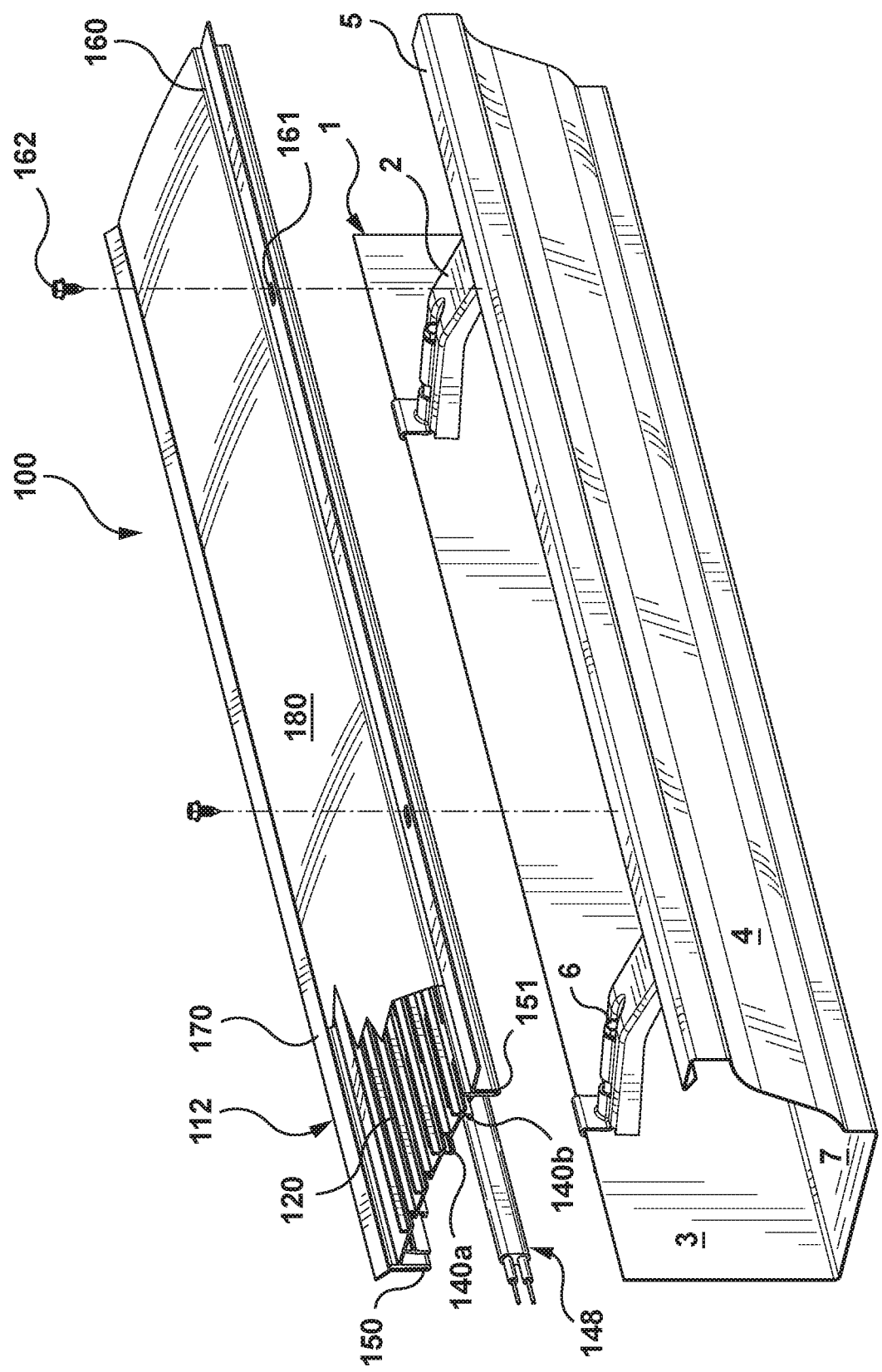
FIG. 8 is an exploded perspective view of an eavestrough and debris guard just prior to installation in accordance with an embodiment hereof.
Figure 9:
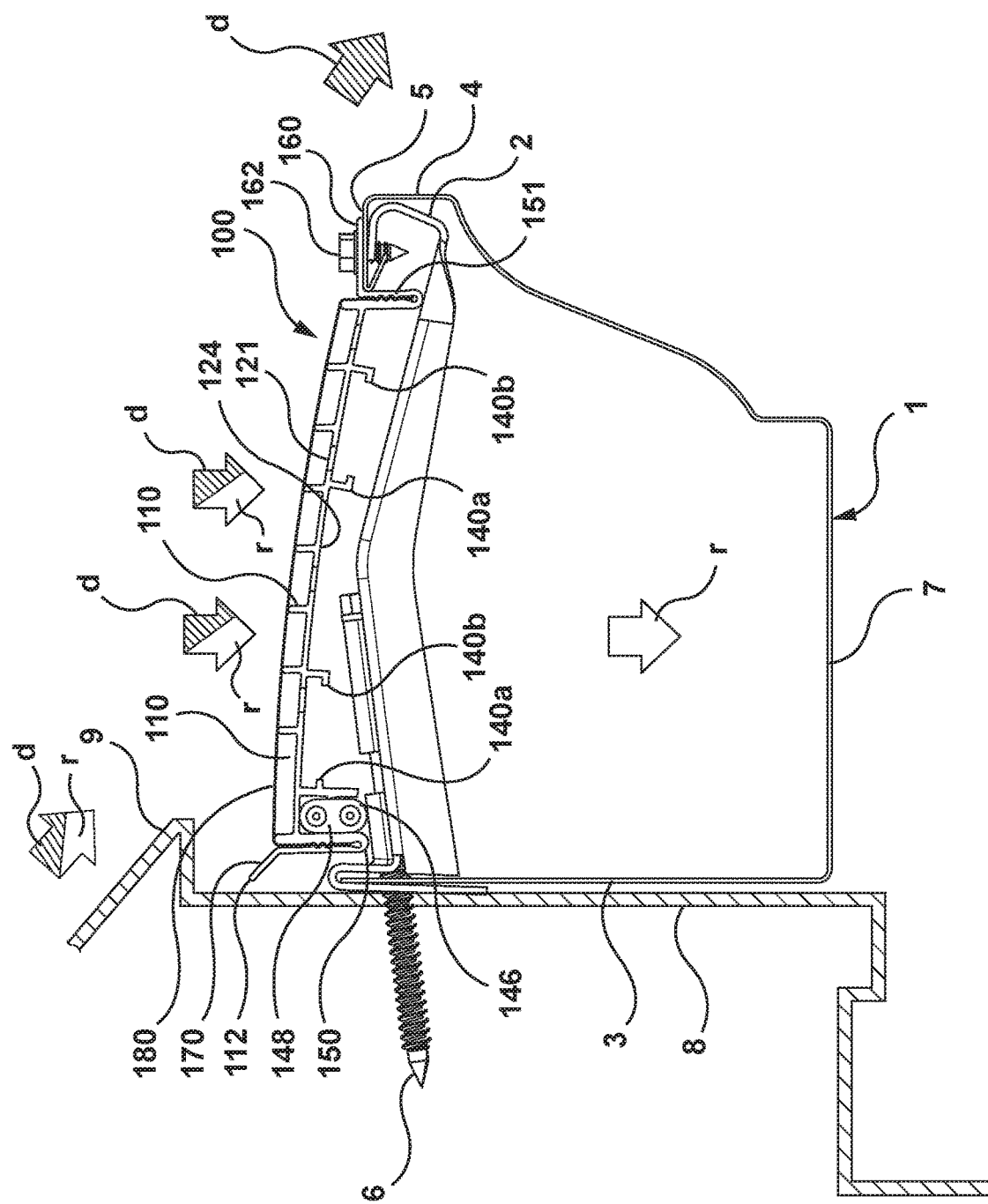
FIG. 9 is a cross-sectional view of the debris guard installed into an eavestrough in accordance with an embodiment hereof.

In the following paragraphs making reference to FIGS. 8 and 9 the installation onto the eavestrough and operation of the debris guard will be described, although it will be described with reference to debris guard embodiment 100 it should be understood that this description applies to all embodiments of debris guards shown and/or described in this application for example but not limited to debris guards 100, 100' 400, 500, 1000, and 1400' shown in FIGS. 4, 5A, and 5B, 11A, 11B, 10, 10A, 10B, 14A, and 14B. FIG. 8 shows the debris guard 100 just prior to assembly and FIG. 9 shows the debris guard 100 installed into a typical eavestrough in cross-section. Although only debris guard 100 in shown installed, embodiments of debris guard described and are installed in the same way. Eavestrough 1 is secured to the building wall 8 just under the roof edge 9 by a plurality of eavestrough hanger brackets 2. Eavestrough 1 has a rear wall extending down, a bottom wall 7 extend outwards from the rear wall and a front wall 4 extending upward from the bottom wall 7 to form a trough which collects the rainwater. Rear wall 3 is attached to the building by a screw 6 goes through the building side or rear end of eavestrough hanger bracket 2 then through the rear wall 3 of the eavestrough and finally into the building 8. Front wall 4 terminates at a flange or lip which is used to receive the other or front end of eavestrough hanger bracket 2. The front end of eavestrough hanger bracket 2 supports the eavestrough 1 at front wall 4 side.

Debris guard 100 is laid over the eavestrough to cover the entire portion of the eavestrough extending beyond the roof edge. The mesh 180 faces up with the vertical debris supports 150 and 151 facing down received inside the eavestrough. The eavestrough fastening portion 160 rests on the top surface of the front flange 5 and the front mesh engagement structure or vertical debris guard support portion 151 is butted against the edge of the front flange 5 and its bottom end rests on top of the front end of eavestrough hanger bracket 2 adjacent the eavestrough 1 front flange 5. Screws 162 are used to fasten the debris guard 100 to the eavestrough through slots or holes 161. The rear mesh engagement structure or vertical debris guard support portion 150 bottom end rests on top of eavestrough hanger bracket 2 adjacent the building wall. Movement of the debris guard relative to the eavestrough is possible because mesh engagement structures or vertical debris guard supports 150, 151 are not fixed to the eavestrough hanger eavestrough hanger brackets 2 and able to slide freely and slot 161 is shaped larger than the screw. When installed a gap remains between the buildings wall 8 and the rear flange or lip 170 at the back side 112 of the debris guard 100. Debris guard is not attached to the building structure itself, only to the eavestrough to allow for expansion and contraction of the eavestrough relative to the building due to changes in temperature as well as to accommodate any flexing due environmental factors such as wind, expansion and contraction of water freezing and thawing in the eavestrough.

A mix of rainwater (r) and debris (d) runs off of roof edge 9 onto the debris guard 100. The rear flange or lip 170 which in this embodiment is angled prevents debris and rain from flowing back towards the building wall 8. Debris guard 100 when installed is inclined at roughly an angle of greater than 0 less than 90°, in this example it is roughly 10°, so that the frame back side 112 is higher than the frame front side 114, the mesh engagement portions or vertical debris guard supports 150, 151 which rest on the top surface of the eavestrough hanger eavestrough hanger bracket 2 set the height and slope of all of the debris guard 100. The purpose of the inclination is to provide a continuous downward angle of the debris guard 100 to direct the rainwater (r) and debris (d) mix off of the roof forward towards the front side 114, enhancing the washing of debris (d) off of the mesh 180. As the rainwater (r) and debris (d) mix flows over the debris guard 100, the rainwater (r) flows through the mesh 110 to the water collection portion 120 of the frame. The water collection portion 120 has several slots or holes 121 which allow the rainwater (r) to pass through to the eavestrough. Debris (d) can be anything that falls onto the building roof or eavestrough, for example: pine needles, pinecones, leaves, and seed pods are prevented from passing through the mesh 180 and are shed off of the debris guard 100.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A debris guard for installation on an eavestrough, the debris guard comprising:
   a frame having:
   a back side, a front side, a length and two ends and an eavestrough fastening portion extending the length of the frame;
   a water collection portion that extends from the front side to the back side and along the length of the frame, the water collection portion having a plurality of holes to allow rainwater to pass through;
   a mesh fastened to the frame so as to cover the water collection portion; and
   a connector engagement structure, for receiving a connector, that extends outward from the water collection portion;
   wherein the connector engagement structure is a pair of connector engagement structures spaced apart.

2. The debris guard according to claim 1, wherein the connector engagement structure extends along the length of the frame.

3. The debris guard according to claim 1, wherein the connector engagement structure extends outward from a bottom surface of the water collection portion.

4. The debris guard according to claim 1, wherein the connector engagement structure extends from a top surface of the water collection portion.

5. The debris guard according to claim 1, wherein the connector engagement structure has a T-shaped cross-section.

6. The debris guard according to claim 5, further comprising a connector with a cut-out, wherein the cut-out is shaped to be slidable onto the connector engagement structure in a snug slide fit.

7. The debris guard according to claim 1, wherein the pair of connector engagement structures extend along the length of the frame.

8. The debris guard according to claim 1, wherein the pair of connector engagement structures extend from a bottom surface of the water collection portion.

9. The debris guard according to claim 1, wherein the pair of connector engagement structures extend from a top surface of the water collection portion.

10. The debris guard according to claim 1, further comprising a connector, wherein the pair of connector engagement structures and the surface of the water collection portion form a connector receiving opening on each end of the frame that is shaped to receive the connector.

11. The debris guard according to claim 10, wherein the connector has a fastener portion and the connector receiving opening is shaped to receive the fastener portion of the connector in a snug slide fit.

12. The debris guard according to claim 11, wherein the connector has a central portion with fastener portions spaced apart and extending outwardly from each side of the central portion.

13. The debris guard according to claim 12, wherein the connector further comprises a joint covering portion along a length of the central portion for covering ends of lengths or pieces of the frame when joined to each other.

14. The debris guard according to claim 11, wherein the pair of engagement structures are joined so that the connector receiving opening is shaped to fully surround the fastener portion of the connector.

15. The debris guard according to claim 1, wherein the plurality of holes allow water to pass through to the eavestrough when the debris guard is installed on the eavestrough.

16. The debris guard according to claim 1, wherein the plurality of holes blocks at least a portion of debris from passing through.

17. The debris guard according to claim 1, wherein the back side is configured to be adjacent a building when the debris guard is installed in the eavestrough.

18. The debris guard according to claim 1, wherein the water collection portion extends contiguously from the front side to the back side and along the length of the frame.

* * * * *